United States Patent
Glasgow

(10) Patent No.: US 12,220,699 B2
(45) Date of Patent: Feb. 11, 2025

(54) LIQUID EVALUATION

(71) Applicant: Forward Biotech, Inc., Troy, NY (US)

(72) Inventor: Ian K. Glasgow, Averill Park, NY (US)

(73) Assignee: Forward Biotech, Inc., Troy, NY (US)

( * ) Notice: Subject to any disclaimer, the term of this patent is extended or adjusted under 35 U.S.C. 154(b) by 783 days.

(21) Appl. No.: 17/424,227

(22) PCT Filed: Jan. 21, 2020

(86) PCT No.: PCT/US2020/014341
§ 371 (c)(1),
(2) Date: Jul. 20, 2021

(87) PCT Pub. No.: WO2020/154248
PCT Pub. Date: Jul. 30, 2020

(65) Prior Publication Data
US 2022/0118445 A1    Apr. 21, 2022

Related U.S. Application Data

(60) Provisional application No. 62/794,942, filed on Jan. 21, 2019.

(51) Int. Cl.
*B01L 3/00* (2006.01)
*B01L 3/02* (2006.01)
(Continued)

(52) U.S. Cl.
CPC ......... *B01L 3/502715* (2013.01); *B01L 3/022* (2013.01); *B01L 3/5088* (2013.01);
(Continued)

(58) Field of Classification Search
CPC .. B01L 3/502715; B01L 3/022; B01L 3/5088; B01L 2200/027; B01L 2200/0605;
(Continued)

(56) References Cited

U.S. PATENT DOCUMENTS 5,192,502 A    3/1993    Attridge et al.
5,230,866 A    7/1993    Shartle et al.
(Continued)

FOREIGN PATENT DOCUMENTS

CN    101187580 A    5/2008
CN    103402641 A    11/2013
(Continued)

OTHER PUBLICATIONS

CN-104094122-A, English Translation (Year: 2014).*
(Continued)

*Primary Examiner* — Ryan D Walsh
(74) *Attorney, Agent, or Firm* — LaBatt, LLC

(57) ABSTRACT

A liquid evaluation system can include a cartridge including a channel configured to pull a liquid into the channel by capillary action. The cartridge can include an upper plate and a lower plate located in close proximity to the upper plate. The lower plate includes a deposition region for dispensing liquid. The extent of the deposition region in one or more directions can be defined by a repellant barrier, such as a boundary with a set of areas configured to be repellant to the liquid. An internal facing surface of each plate can include a corresponding region forming the channel. Each of the regions can be configured to have an affinity for the liquid. The close proximity of the plates and the regions having an affinity for the liquid cause the liquid to be pulled into the channel by capillary action.

20 Claims, 11 Drawing Sheets

(51) Int. Cl.
*G01F 23/02* (2006.01)
*G01F 25/00* (2022.01)

(52) U.S. Cl.
CPC .......... *G01F 23/02* (2013.01); *G01F 25/0084* (2013.01); *B01L 2200/027* (2013.01); *B01L 2200/0605* (2013.01); *B01L 2200/148* (2013.01); *B01L 2300/028* (2013.01); *B01L 2300/0816* (2013.01); *B01L 2300/0861* (2013.01); *B01L 2300/161* (2013.01); *B01L 2400/0406* (2013.01)

(58) Field of Classification Search
CPC ......... B01L 2200/148; B01L 2300/028; B01L 2300/0816; B01L 2300/0861; B01L 2300/161; B01L 2400/0406; G01F 23/02; G01F 25/0084
See application file for complete search history.

(56) References Cited

U.S. PATENT DOCUMENTS

| | | | |
|---|---|---|---|
| 5,458,852 | A | 10/1995 | Buechler |
| 5,498,392 | A | 3/1996 | Wilding et al. |
| 5,935,430 | A | 8/1999 | Craig |
| 6,193,647 | B1 | 2/2001 | Beebe et al. |
| 6,695,765 | B1 | 2/2004 | Beebe et al. |
| 6,921,514 | B1 | 7/2005 | Vetter et al. |
| 7,189,580 | B2 | 3/2007 | Beebe et al. |
| 8,091,405 | B2 | 1/2012 | Schmid et al. |
| 9,174,215 | B2 | 11/2015 | Vulto et al. |
| 9,962,696 | B2 | 5/2018 | Vulto et al. |
| 10,233,415 | B1 | 3/2019 | Mathur et al. |
| 10,450,542 | B2 | 10/2019 | Vulto et al. |
| 11,278,890 | B2 | 3/2022 | Denomme et al. |
| 2001/0051113 | A1 | 12/2001 | Juncosa et al. |
| 2002/0022261 | A1 | 2/2002 | Anderson et al. |
| 2002/0058329 | A1 | 5/2002 | Singh et al. |
| 2003/0017467 | A1 | 1/2003 | Hooper et al. |
| 2003/0121788 | A1 | 7/2003 | Gascoyne et al. |
| 2004/0028566 | A1 | 2/2004 | Ko et al. |
| 2004/0067166 | A1 | 4/2004 | Karinka et al. |
| 2005/0009101 | A1 | 1/2005 | Blackburn |
| 2005/0019224 | A1 | 1/2005 | Pechter et al. |
| 2005/0019231 | A1 | 1/2005 | Kahl |
| 2005/0229696 | A1 | 10/2005 | Takayama |
| 2005/0229722 | A1 | 10/2005 | Howell et al. |
| 2006/0214101 | A1 | 9/2006 | Takahashi et al. |
| 2007/0160474 | A1 | 7/2007 | Iida |
| 2007/0242105 | A1 | 10/2007 | Srinivasan et al. |
| 2007/0286774 | A1 | 12/2007 | Barholm-Hansen et al. |
| 2008/0066523 | A1 | 3/2008 | Schmid et al. |
| 2008/0257754 | A1 | 10/2008 | Pugia et al. |
| 2009/0127123 | A1 | 5/2009 | Raccurt et al. |
| 2010/0045147 | A1 | 2/2010 | Harnack et al. |
| 2010/0254858 | A1 | 10/2010 | Paulraj et al. |
| 2011/0053289 | A1 | 3/2011 | Lowe et al. |
| 2011/0056287 | A1 | 3/2011 | Schardt et al. |
| 2011/0243795 | A1 | 10/2011 | Park |
| 2012/0004140 | A1 | 1/2012 | Staker |
| 2012/0184464 | A1 | 7/2012 | Lee et al. |
| 2013/0121877 | A1 | 5/2013 | Ono |
| 2013/0345088 | A1 | 12/2013 | Noji et al. |
| 2015/0040999 | A1 | 2/2015 | Vulto et al. |
| 2016/0025116 | A1 | 1/2016 | Vulto et al. |
| 2016/0067709 | A1* | 3/2016 | Sun .................. B01L 3/502707 422/503 |
| 2016/0199832 | A1 | 7/2016 | Jamshidi et al. |
| 2016/0231163 | A1 | 8/2016 | Van't Oever et al. |
| 2016/0265026 | A1 | 9/2016 | Brettschneider et al. |
| 2017/0045504 | A1 | 2/2017 | Blom et al. |
| 2018/0095067 | A1 | 4/2018 | Huff et al. |
| 2018/0250672 | A1 | 9/2018 | Jamshidi et al. |
| 2018/0311666 | A1 | 11/2018 | Dhindsa et al. |
| 2019/0030537 | A1 | 1/2019 | Hadwen et al. |
| 2019/0142311 | A1 | 5/2019 | Heikenfeld et al. |
| 2019/0247851 | A1* | 8/2019 | Virey ................ B01L 3/502715 |
| 2020/0023357 | A1 | 1/2020 | Glasgow |
| 2021/0170403 | A1 | 6/2021 | Waterman |
| 2021/0362151 | A1 | 11/2021 | Karunakaran et al. |
| 2021/0394185 | A1 | 12/2021 | Goto et al. |
| 2022/0062901 | A1 | 3/2022 | Keefe et al. |
| 2023/0092258 | A1 | 3/2023 | Kurz et al. |
| 2024/0003930 | A1* | 1/2024 | Hurlburt ................ G01F 19/00 |

FOREIGN PATENT DOCUMENTS

| | | | | |
|---|---|---|---|---|
| CN | 104094122 | A | * 10/2014 | ............ B01L 3/502 |
| EP | 0321736 | A2 | 6/1989 | |
| EP | 2213364 | A1 | 8/2010 | |
| EP | 2374540 | A2 | 10/2011 | |
| EP | 3072594 | A1 | 9/2016 | |
| EP | 3130401 | A1 | 2/2017 | |
| GB | 2275428 | A | 8/1994 | |
| JP | 2013156271 | A | 8/2013 | |
| WO | 2007050013 | A1 | 5/2007 | |
| WO | 2015099532 | A1 | 7/2015 | |
| WO | 2016195480 | A1 | 12/2016 | |
| WO | 2018183896 | A1 | 10/2018 | |

OTHER PUBLICATIONS

Chinese Application No. 201880028976.6, Office Action 2, Nov. 22, 2021, 18 pages (including automated English language translation).
Lyle, S., U.S. Appl. No. 16/497,650, Final Office Action 1, filed Sep. 20, 2021, 25 pages.
Notice of Allowance for U.S. Appl. No. 18/369,535, filed Jul. 5, 2024, 10 pages.
Chinese Application No. 201880028976.6, Notice of Grant, Feb. 28, 2022, 2 pages (no English translation).
Lyle, S., U.S. Appl. No. 16/497,650, Office Action 2, filed Feb. 18, 2021, 34 pages.
Lyle, S., U.S. Appl. No. 16/497,650, Final Office Action 2, filed Jul. 13, 2022, 35 pages.
Lyle, S., U.S. Appl. No. 16/497,650, Notice of Allowance, filed Nov. 9, 2022, 12 pages.
Office Action for European Patent Application No. 18719006.1, mailed Jul. 25, 2023, 6 pages.
International Search Report and Written Opinion for International Application No. PCT/US2022/052338, Apr. 25, 2023, 10 pages.
Office action for U.S. Appl. No. 18/369,535, filed Dec. 4, 2023, 15 pages.
Final office action for U.S. Appl. No. 18/369,535, filed Mar. 25, 2024, 21 pages.
Kim, Y., International Application No. PCT/US2018/025472, International Search Report and Written Opinion, Jun. 14, 2018, 15 pages.
Goodman, Marco, EP Application No. 18719006.1-1101, Office Action 1, Nov. 23, 2020, 5 pages.
Chinese Application No. 201880028976.6, Office Action 1, Mar. 26, 2021, 10 pages (english summary).
Lyle, Sophia Yuan, Office Action for U.S. Appl. No. 16/497,650, filed Apr. 23, 2021, 22 pages.
Peschier, Yvonne, International Application No. PCT/US2020/014341, International Search Report and Written Opinion, May 25, 2020, 11 pages.

* cited by examiner

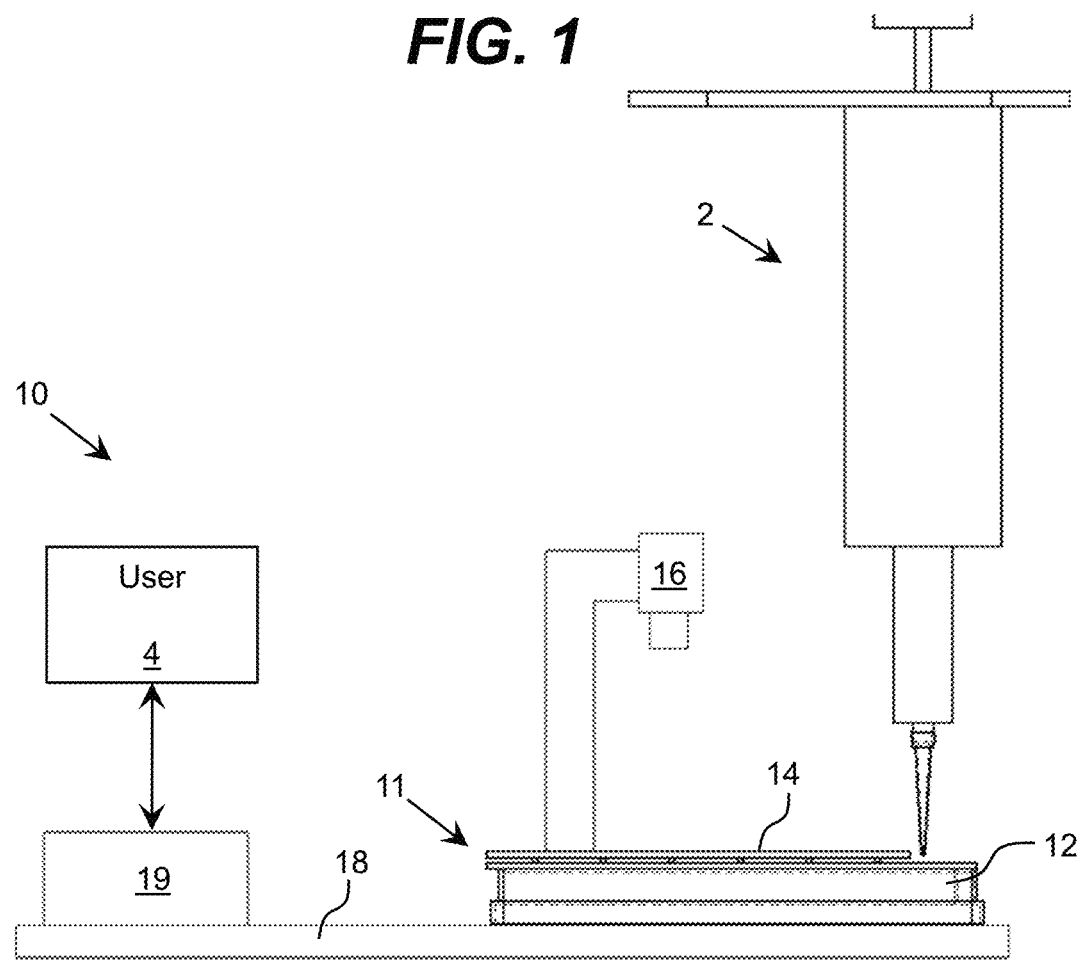
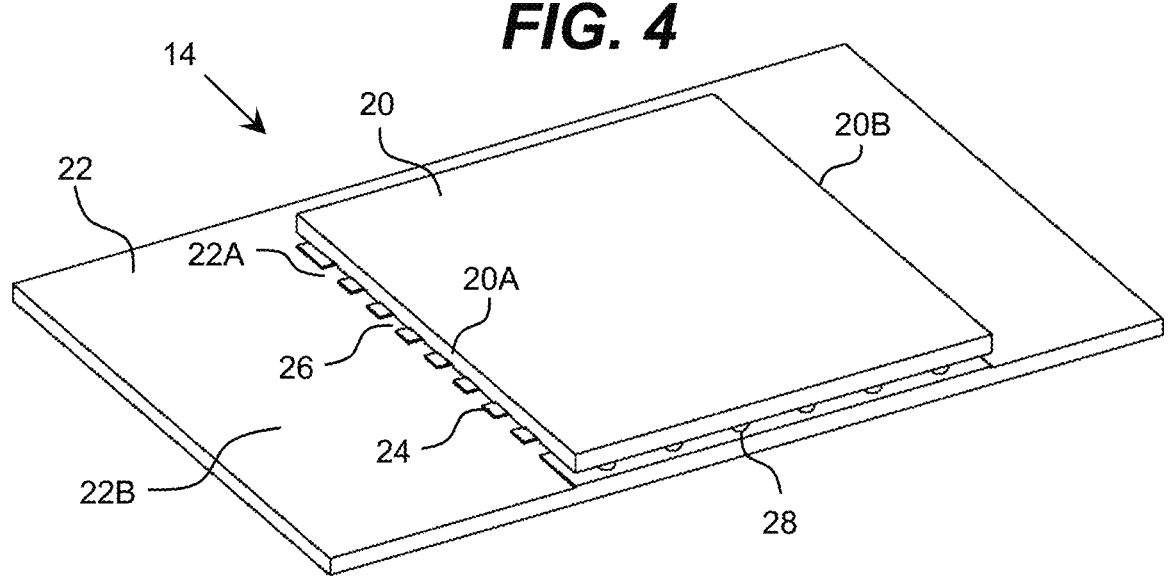

LIQUID EVALUATION

REFERENCE TO RELATED APPLICATIONS

The current application is a U.S. national stage application of International Application No. PCT/US2020/014341, filed on 21 Jan. 2020, which claims the benefit of U.S. Provisional Application No. 62/794,942, filed on 21 Jan. 2019, each of which is hereby incorporated by reference.

TECHNICAL FIELD

The disclosure relates generally to evaluation of a dispensed liquid, and more particularly, to a liquid evaluation solution that uses one or more channels in a cartridge.

BACKGROUND ART

Liquid handling systems are an essential tool used extensively in laboratories used for biology, chemistry, and other fields. A commonly utilized example of a liquid handling system is a pipette. The pipette is used to transfer an accurate volume of liquid from one container to another, e.g., for assays, chemical reactions, and other purposes. A pipette typically includes a piston placed on an end of the pipette, which displaces air. The piston can be operated to reduce air pressure above a liquid to suck the liquid into a pipette tip, or increase air pressure to force the liquid out of the pipette tip.

Pipettes are used with volumes ranging over several orders of magnitude, from about 1 microliter to over 1 milliliter. Fixed volume pipettes are configured to be used for transferring a single volume of liquid. Adjustable pipettes can handle a range of volumes, typically on the order of a single order of magnitude. Therefore, a laboratory often has multiple pipettes to cover a range of volumes.

With use or misuse, pipettes can fall out of calibration. Routine calibration of pipettes is common, and even required in many applications. For example, international standards, such as ISO 8655, regulate the required accuracy and repeatability of pipettes.

The most common existing approach for determining the accuracy of a liquid handling device, such as a pipette, and/or a corresponding system including the liquid handling device, uses a balance to measure a mass of the dispensed liquid. The liquid's mass is then converted to volume based upon a known density of the liquid at a measured temperature of the liquid. Commonly, distilled water is used for this purpose. However, this approach has drawbacks.

For example, the balance must be very sensitive. To this extent, to accurately measure microliter volumes of liquid to better than 1%, the balance must be more accurate than 10 micrograms. Balances this accurate are expensive and not common. Additionally, these balances are subject to errors from air currents across the pan, vibrations, and evaporation. Evaporation also is a source of error in the measurement, which is difficult to control to negligible levels, especially considering the relatively large amount of surface exposed to air relative to the volume of the dispensed liquid. In addition, this solution is not a direct measurement of the volume. Rather, a mass measurement must be converted to volume using additional measurements, including that of the liquid's density and/or its temperature (which can be converted to density), each of which further reduces an accuracy of this measurement approach.

An alternative approach for measuring liquid handling device accuracy uses a colorimetric measurement. In this approach, the liquid handling device is used to dispense a volume of a liquid dye in which the color is very accurately controlled, into a well with a known volume of liquid, and a change in color is measured. This measurement approach also does not directly measure the liquid volume. Furthermore, the measured change in color must be combined with additional measurements (e.g., volume of the other liquid, temperature, density, and/or the like), in order to deduce the dispensed volume, further reducing the accuracy of this approach. Additionally, similar to the previously described approach, this approach also requires expensive equipment, mathematics, and must be performed where the equipment is located.

A more effective approach for measuring liquid handling device accuracy uses a cartridge for evaluating the volume of a liquid. In this approach, the cartridge can have one or more well tabs that pivot into a position in which liquid dispensed into a corresponding well is placed in contact with a capillary. Surface tension draws the liquid from the well into the capillary. Comparison of one or both liquid-air interfaces with markings on or near the capillary can reveal the volume of liquid dispensed.

In many applications, it is desirable to transfer multiple liquid volumes simultaneously. For example, this is often the case when working with well plates. In response, multichannel liquid handling devices have been developed. For example, multichannel pipettes exist, often with 8, 12, or 16 channels. Likewise, other multichannel liquid handling systems, including robotic systems, often dispense multiple volumes of liquids simultaneously. The accuracy of the liquid volume dispensed from each channel using each of these multichannel liquid handling devices also requires checking and calibration. Naturally, checking the accuracy and calibrating multichannel liquid handling devices is much more tedious and difficult than doing such for single channel liquid handling devices.

To date, the most common approach to determine the accuracy of a multichannel liquid handling device includes separately measuring, such a gravimetrically with a balance, liquid volumes dispensed from each channel.

Another approach uses a cartridge with multiple glass capillaries. The user can dispense aliquots (samples) of liquid into multiple wells simultaneously, flip the wells into position so that the aliquots of liquid contact the entrances to the capillaries, at which time capillary action draws the liquid into the capillaries. By knowing the internal diameter of the capillaries and the lengths of capillaries filled by the aliquots of liquid, one knows the volumes of liquid in the capillaries, and thus the volumes that were dispensed. This method requires the user to flip the wells into position and is limited by the effectiveness of capillary action in round ducts.

Another liquid evaluation system uses a cartridge including channels configured to pull a liquid into the channels by capillary action. The cartridge can include a first plate and a second plate located in close proximity to the first plate, which can be oriented in an upright position. An internal facing surface of each plate can include regions forming the channels. Each of the regions can have an affinity for the liquid. The close proximity of the plates and the regions having an affinity for the liquid cause the liquid to be pulled into the channel by capillary action.

SUMMARY OF THE INVENTION

The inventor recognizes that many approaches for determining the accuracy of a multichannel liquid handling device, such as a multichannel pipette, can be quite tedious, expensive, and require multiple measurements, each of which potentially introduces error into the measurement process.

An embodiment of the device is configured for measuring the volume of a liquid dispensed, for example, from a robotic dispenser or a multi-channel pipette.

An embodiment of the device relies upon surface tension to draw an aqueous solution between two hydrophilic inner facing surfaces of two plates, such as glass plates or any type of substrate with suitable inner facing surfaces. Another embodiment can draw an oil-based liquid between two lipophilic (e.g., oil friendly) inner facing surfaces of two plates, such as clear plastic plates or any type of substrate with suitable inner facing surfaces. Embodiments described herein discuss features relevant for aqueous liquids, although the teachings apply equally to oil-based liquids.

The channel boundaries can be defined by a repellant material, such as one or more hydrophobic coatings (or lipophobic coatings). The coating(s) can be very accurately patterned using any solution, such as a photoresist coating patterned with a standard photolithography technique. Many photolithography coatings are hydrophobic. In another embodiment, the hydrophilic (or lipophilic) regions can be located where the coating is, and the regions without a coating can repel the liquid being measured. Markings, such as graduation lines, can be located along one or both sides of the channel, above the channel, underneath the channel, and/or the like. The markings can visually indicate the volume of the liquid located within one or more of the channels, a scale for evaluation using image processing, and/or the like. Markings are not shown in all figures for clarity. Regardless, it is understood that the markings can be similar to other markings utilized in liquid measurement fields, such as on thermometers (e.g., lines located along the side of the liquid), graduated cylinders (e.g., lines that are located on a transparent surface), and/or the like.

A separation distance between the inner facing surfaces of the plates can be accurately controlled, e.g., by accurate spacing balls, such as those used for liquid crystal displays (LCDs). However, other solutions can be employed for spacing the plates at a desired separation distance. The separation distance between the plates can be substantially uniform or non-uniform. For example, the separation distance can be tapered to affect how and where the liquid travels within the channel. Tapered spacing can aid in forcing the liquid to a desired region (e.g., with the smaller spacing), such as causing the liquid to stay near an entrance of the channel, travel to and collect at a far end of the channel, and/or the like. Regardless, the actual spacing can be accurately measured and recorded after manufacturing. An indication corresponding to the measured spacing can be recorded on the cartridge and used in the calculation of the volume of liquid.

Other solutions can be employed to encourage the liquid to move to a certain region of the channel. For example, a channel can include a region have more or less affinity for the liquid, e.g., by including or not including surface texturing, repellant islands, variations in a coating on the channel surface, and/or the like.

In an embodiment, the device can be configured such that a user places ends of pipette tips of a multichannel pipette at the entrances to the channels. The device can include a lower plate that includes a deposition region for the channel. The deposition region can be formed on a portion of the lower plate that extends beyond a proximal end of an upper plate. In an embodiment, the deposition region is a shallow deposition region, which is not physically enclosed (e.g., a well), but is substantially open in at least one lateral direction. The extent of the deposition region in one or more directions can be defined by a repellant barrier, such as a boundary with a set of areas configured to be repellant to the liquid. The device can include one or more guides to assist with positioning the tips in the correct location and at the correct distance from the channel entrances. A guide can include a notch and/or a non-vertical surface, which can assist with positioning a tip at the entrance to the channel.

In an embodiment, the user (e.g., a human or a robot) dispenses liquid onto a deposition region having an affinity to the liquid near the channel entrance. As more liquid is dispensed, the dispensed droplets grow in size and/or the liquid spreads out along a surface of the deposition region and encounters the channel entrance. The spread of the liquid can be limited by a boundary with a set of areas that are repellant to the liquid. The additional surface area (due to the presence of the upper plate) located at the channel entrance having an affinity to the liquid encourages the liquid to enter the channel. Surface tension encourages the entire liquid droplet to remain contiguous and enter the channel.

When the liquid fills a cross-sectional area of a channel, a volume of the liquid can be calculated by knowing a distance between the opposing ends of the liquid in the channel and the dimensions (width and height) of the channel where the liquid is present. A cross sectional area of the channel can vary in any direction along the length of the channel. The liquid can be colored with a color having a contrast with a background (e.g., provided by a color of one of the plates and/or a coating defining the channel boundaries). For example, the liquid can include a dye to make the liquid aliquot (sample) more visible and facilitate a more ready and/or accurate reading of a location of the meniscus at either or both ends of the liquid aliquot.

For instance, when the liquid fills up one end of the channel, determining or knowing (to an acceptable degree of accuracy) a distance from the end of the channel to the meniscus located opposite the end of the channel, a width of the channel, and a height of the channel, allows calculation of the volume of the liquid, e.g., using an approach analogous to a graduated cylinder, in which the liquid is in a cylinder of known cross sectional area and occupies a volume from the bottom of the cylinder up to the meniscus. While the liquid may not form a rectangular cross-section, the calculation can account for the convex surfaces on the sides of the liquid in the channel. Markings (e.g., graduations) can be used to indicate one or more volumes, a range of volumes (e.g., an acceptable range +/− a target volume to be dispensed), and/or the like. Such markings can be located along one or both sides of the channel.

The separation distance(s) between the plates, and therefore a height or depth of the channel, can be known from the manner in which the device is manufactured. For example, the height of ball spacers can correspond to the separation distance at a given location. In an embodiment, actual separation distances of the plates can be measured in several locations along the channel, and the separation distance at any position along the channel can be interpolated or extrapolated from these measurements. The widths of the channels at any position can be measured, e.g., optically or by other means, and/or be manufactured using a solution that results in widths known to a high degree of accuracy.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 1 shows an illustrative liquid evaluation system according to an embodiment.

FIG. 4 shows a perspective view of an illustrative multichannel cartridge according to another embodiment.

FIGS. 6A and 6B show top and detailed top views, respectively, of an illustrative cartridge according to an embodiment, while

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 2A:
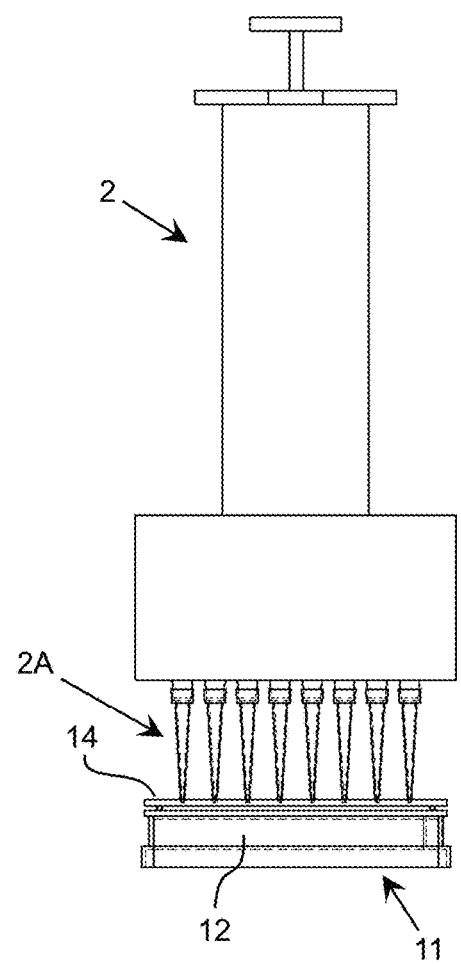
FIGS. 2A and 2B show a front view and a side view, respectively, of a multichannel pipette being used in conjunction with an illustrative device including a stand and multichannel cartridge according to an embodiment.

As indicated above, aspects of the invention provide a liquid evaluation system. The system can include a cartridge including a channel configured to pull a liquid into the channel by capillary action. The cartridge can include an upper plate and a lower plate located in close proximity to the upper plate. The lower plate can include a deposition region for dispensing liquid, which can be at least partially open, e.g., without walls forming a lateral enclosure. The deposition region can comprise an adjacent notch with a non-vertical face, a region at least partially defined by a boundary with a material configured to be repellant to the liquid, and/or the like, to encourage dispensed liquid to enter the channel. An internal facing surface of each plate can include a corresponding region forming the channel. Each of the regions can have an affinity for the liquid. The close proximity of the plates and the regions having an affinity for the liquid cause the liquid to be pulled into the channel by capillary action. The cartridge can include one or more additional attributes and/or the system can include one or more additional components for performing the evaluation.

It is understood that, unless otherwise specified, each value is approximate and each range of values included herein is inclusive of the end values defining the range. As used herein, unless otherwise noted, the term "approximately" is inclusive of values within +/− ten percent of the stated value, while the term "substantially" is inclusive of values within +/− five percent of the stated value. Unless otherwise stated, two values are "similar" when the smaller value is within +/− twenty-five percent of the larger value. A value, y, is on the order of a stated value, x, when the value y satisfies the formula $0.1x \leq y \leq 10x$.

As also used herein, a transparent structure allows at least ten percent of radiation having a target wavelength, which is radiated at a normal incidence to an interface of the structure, to pass there through. Furthermore, as used herein, a reflective structure reflects at least ten percent of radiation having a target wavelength, which is radiated at a normal incidence to an interface of the structure.

As used herein, a proximal end of a plate refers to an end of the plate that includes an entrance for the channel, while a distal end of a plate refers to an end of the plate that is located opposite the end of the plate with the entrance. Unless otherwise stated, the term "lateral" refers to a plane that is at a right angle to the principal axis for the channel, and "lateral area" refers to a two-dimensional area of the lateral plane for a corresponding region. These terms are used for convenience and do not imply any orientation of the cartridge during use.

Turning to the drawings, FIG. 1 shows an illustrative liquid evaluation system 10 according to an embodiment. The system 10 is shown including a device 11 within which liquid can be evaluated. The device 11 can comprise a stand 12, which is configured to position a cartridge 14 in a desired orientation for dispensing a liquid into one or more channels located in the cartridge 14 for subsequent evaluation. Once the cartridge 14 has been positioned, the liquid can be dispensed into one or more channels of the cartridge 14, e.g., using a liquid handling device 2. The system 10 can be used to evaluate one or more attributes of the liquid located in the channel(s) using any solution.

To this extent, the system 10 is also shown including an imaging device 16. The imaging device 16 can acquire image data of one or more of the channels of the cartridge 14 using any solution, which can be used as part of the evaluation of one or more of the attributes of the liquid. Illustrative imaging devices 16 include a camera which generates image data from any type of radiation (e.g., visible light), an electric circuit which senses changes in capacitance, induction, and/or resistance, at one or more points, or along a one-, two-, or three-dimensional gradient, a device that uses a scanning solution instead of a lens for generating an image, and/or the like. In an embodiment, the system 10 can further include a base 18, which is configured to hold the device 11 (e.g., the stand 12) and the imaging device 16 at an orientation that allows the imaging device 16 to acquire suitable image data of the channel(s) in the cartridge 14. For example, the base 18 can include one or more grooves, markings, and/or the like, that can direct a user as to proper placement of the stand 12 and the imaging device 16. In an embodiment, one or more of the stand 12 or the imaging device 16 is secured to the base 18 using any solution. Regardless, as illustrated, the imaging device 16 can be mounted and oriented such that its field of view is approximately orthogonal to a plane of a top of the cartridge 14.

In an embodiment, the imaging device 16 can provide the image data to a computer system 19. The computer system 19 can comprise any combination of one or more computing devices. Each computing device can be any type of computing device. An illustrative computing device includes a general purpose computing device programmed to perform some or all of an evaluation process described herein. However, it is understood that a computing device can comprise any type of computing device that may or may not execute program code. When the computer system 19 includes multiple computing devices, the computing devices can be located in disparate locations and communicate with one another via any combination of optical fiber, wired, and/or wireless links; utilize any combination of one or more types of networks; and/or utilize any combination of various types of transmission techniques and protocols.

The evaluation process can be automated, semi-automated, or manual. Regardless, the computer system 19 can include a set of interfaces that enable a user 4 (e.g., a human and/or another computing device) to direct operation of the system 10 to perform an evaluation and/or otherwise interact with the system 10. For example, the user can obtain the results of an evaluation, review past evaluations, manage the data for one or more evaluations, etc. While not shown, it is understood that the system 10 can include any combination of various other devices that may be suitable for use in the evaluation. Such devices can include one or more lighting (visible or other radiation) devices, sensors for ambient conditions such as temperature or pressure, a container of a liquid (e.g., a dye or dyed liquid) to be used in an evaluation, and/or the like.

The computer system 19 can store the image data along with other data as a record of an evaluation. The other data can include any combination of various data corresponding to the evaluation including, for example: identification information for one or more of: a user, a liquid handling device (e.g., a serial number), a cartridge (e.g., serial number, cartridge identifier, etc.), and/or identification data of the liquid (e.g., type of liquid used, location of a sample, etc.); a date and time stamp; temperature data; measurement data; a result of the evaluation; and/or the like. In an embodiment, the computer system 19 can process the image data to evaluate one or more of the attributes of the liquid. For example, the computer system 19 can process the image data to determine (measure) one or more of: a volume, a color, a clarity, and/or the like, of the liquid present in a channel.

The system 10 can be configured for use in conjunction with any type of liquid handling device 2 or system. An example of a liquid handling device is a pipette. The pipette can comprise any of various types of pipettes used in the art. In a more particular embodiment, the pipette is a multichannel pipette, as illustrated in FIG. 1. The pipette can be utilized by a human user or operated by a robotic device under automatic or semiautomatic control. However, it is understood that a pipette is only illustrative of various types of human and/or machine operated liquid handling devices capable of being used in conjunction with embodiments of the invention described herein, such as robotic liquid handlers.

Additional details of illustrative aspects of the invention are further described in conjunction with a system including a multichannel cartridge, which can be used to measure a volume of a liquid in one or more of the channels of the cartridge. The volume measurement can be part of, for example, a process for determining an accuracy of a liquid handling device (e.g., a single or multichannel pipette), a consistency and/or accuracy with which a volume of liquid is dispensed by a liquid handling system (e.g., a robotic system, a user operating a pipette, and/or the like). The multichannel cartridge can include a number of channels with a corresponding spacing between the channels that are configured to enable a corresponding multichannel liquid handling device to concurrently dispense liquid from each of its dispensing spouts into distinct channels of the cartridge.

However, it is understood that embodiments of the invention described herein are not limited to multichannel cartridges and/or liquid volume measurement. To this extent, embodiments of the invention can comprise a cartridge including a single channel. Additionally, embodiments of the invention can be utilized to evaluate one or more other attributes of the liquid volume, such as a color, a clarity, and/or the like. Such evaluations can be part of various processes for evaluating a liquid, such as for a presence of one or more chemicals, contaminants, and/or the like. In this case, a liquid sample can be obtained and placed within a channel, with or without treatment, to evaluate the corresponding attribute(s) of the liquid. Still further, embodiments of a multichannel cartridge can include channels configured to measure different volumes of a liquid, e.g., to enable testing of an ability of a liquid handling system to accurately dispense different volumes of liquid.

Regardless, the liquid can be any type of liquid that is desired for evaluation and/or suitable for evaluating a liquid handling system. Illustrative liquids include any of various aqueous liquids, such as water, a biological sample (e.g., blood), a reagent, a buffer solution, etc., any of various oil-based liquids, such as petroleum products, lipids, etc. When the evaluation is performed as part of analyzing an accuracy and/or consistency of a liquid handling system in dispensing a volume of liquid, the liquid can be configured to assist in measuring the volume to a desired degree of accuracy. For example, the liquid can be water distilled to a particular target purity level, a liquid that has been dyed to have a color that visually distinguishes (e.g., by increasing a contrast between) the liquid and the cartridge or other environment, and/or the like. In embodiments where one or more other attributes of the liquid are evaluated, the liquid can comprise any type of liquid sample. For example, the liquid can comprise water, which is sampled from any of numerous locations, blood drawn from a patient, and/or the like.

Figure 2B:
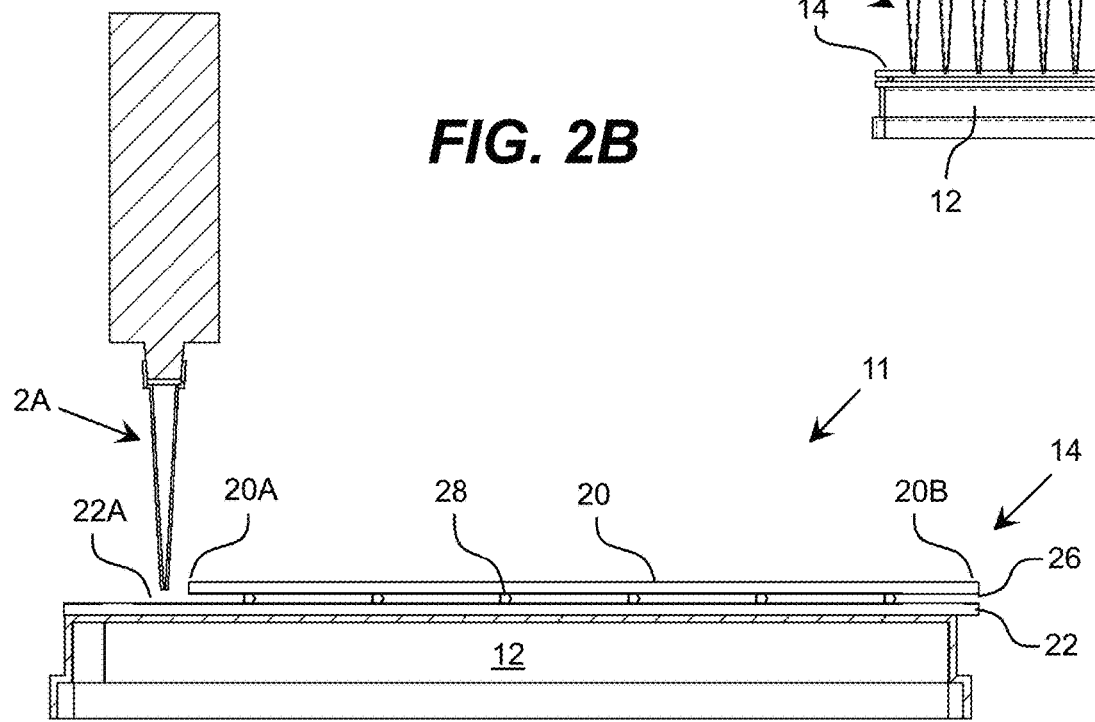

Additional details of embodiments of the invention are shown in FIGS. 2A and 2B, which show a front view and a side view, respectively, of a multichannel pipette 2 being used in conjunction with an illustrative device 11 including a stand 12 and multichannel cartridge 14, according to an embodiment. In the drawings, a multichannel pipette 2 is shown being used in conjunction with the stand 12 and the cartridge 14. However, it is understood that this is only illustrative of various liquid handling devices that can be utilized. Regardless, as shown, the pipette 2 can be operated such that each dispensing spout (e.g., tip) 2A is located adjacent to a deposition region 22A for a channel 26 of the cartridge 14, at which time the pipette 2 can be operated to dispense the liquid onto the deposition region 22A. As illustrated, the deposition region 22A is a shallow deposition region. As used herein, a deposition region is shallow when an extent of the deposition region is not completely defined by a physical barrier providing a significant depth (i.e., more than 150 microns) that prevents the liquid from flowing in any direction other than into the channel 26. To this extent, the cartridge 14 and/or stand 12 can include one or more attributes described herein, which causes the liquid to be pulled into an entrance for the channel 26 and the channel 26, e.g., by capillary action.

The stand 12 can be configured to position the multichannel cartridge 14 in a desired orientation so that the liquid can be dispensed and evaluated. In an embodiment, the stand 12 is configured to position the cartridge 14 in a substantially horizontal orientation. However, it is understood that this is only illustrative.

Figure 3A:
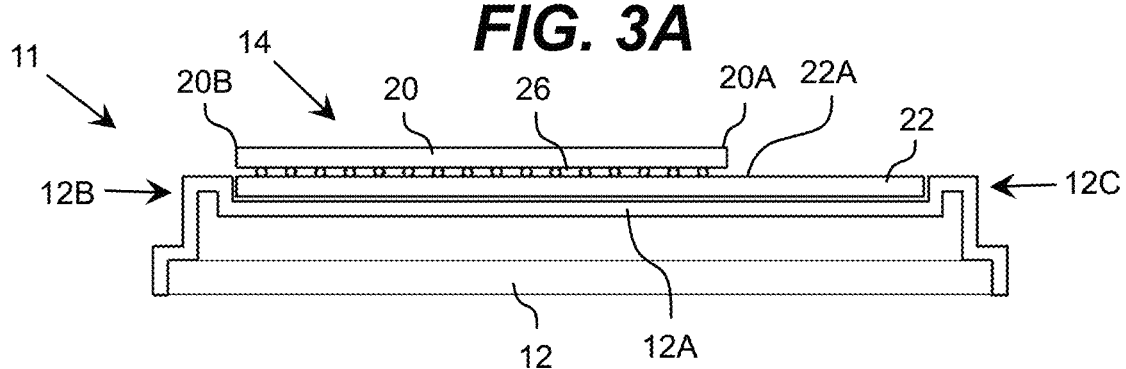
FIGS. 3A-3C show illustrative devices according to embodiments with different configurations for the corresponding stands.
Figure 3B:
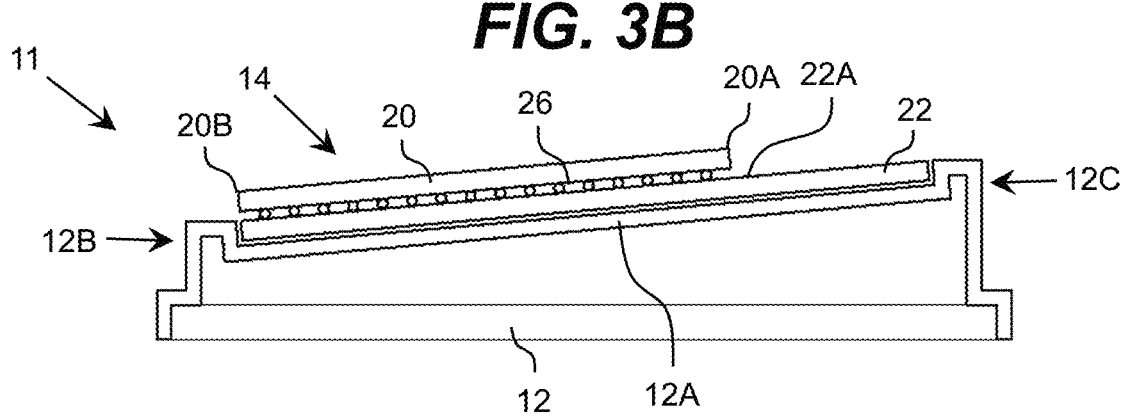
Figure 3C:
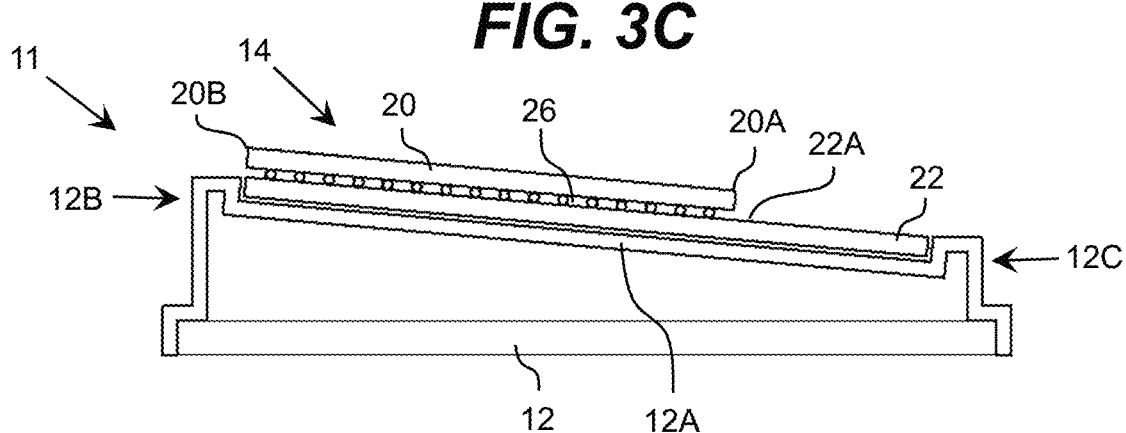

To this extent, FIGS. 3A-3C show illustrative devices 11 according to embodiments with different configurations for the corresponding stands 12. In FIG. 3A, the device 11 comprises a stand 12 that is configured to position the cartridge 14 in a substantially horizontal orientation. In this case, the channel(s) 26 of the cartridge 14 that extend between the proximal and distal ends 20A, 20B of the upper plate 20 can be substantially horizontal (e.g., except for any tapering, if present, as described herein).

As shown in FIG. 3B, the device 11 can comprise a stand 12 that is configured to position the cartridge 14 such that the lower plate 22 is oriented at an angle with respect to horizontal. In this case, the angle can be such that the deposition region 22A for the channel 26 is higher than the channel 26. In this configuration, the cartridge 14 can encourage gravity to pull the liquid downhill into the channel 26 and toward the distal end 20B of the upper plate 20, away from the entrance of the channel 26 and the deposition region 22A. In this case, a volume of the liquid aliquot can be measured from the distal end 20B of the channel 26 to a meniscus located within the channel 26.

As shown in FIG. 3C, the device 11 can comprise a stand 12 that is configured to position the cartridge 14 such that the deposition region 22A for the channel 26 is lower than the channel 26. In this configuration, the cartridge 14 forces the liquid to move uphill into the channel 26. Gravity can encourage the liquid to stay at the proximal end 20A of the upper plate 20 (e.g., the entrance of the channel 26). In this case, a volume of the liquid aliquot can be measured from the proximal end 20A of the channel 26 to a meniscus located within the channel 26.

The stand 12 can position the cartridge 14 using any solution. For example, the stand 12 can be configured such that the cartridge 14 can be laterally inserted into a desired position. In this case, the stand 12 can include a recessed mounting region 12A located between two protruding areas 12B, 12C, which direct the cartridge 14 into position. However, it is understood that this is only illustrative of numerous solutions for positioning the cartridge 14 using the stand 12. Other solutions can insert the cartridge 14 from the top, bottom, front, back, and/or the like. Additionally, the stand 12 and cartridge 14 can be configured to secure the cartridge 14, e.g., using a catch or fastener, which can secure the cartridge 14 (e.g., the lower plate 22 of the cartridge 14) in position and can allow the cartridge 14 to be removed from the stand 12 when desired. Regardless, the stand 12 and cartridge 14 can be sized so that the cartridge 14 is appropriately positioned when inserted into the stand 12 and abutting a mechanical stop. Additionally, the stand 12 and cartridge 14 can include one or more features (e.g., complementary shapes, visual indicators, and/or the like) that ensure that the cartridge 14 is inserted into the stand 12 with the deposition regions 22A for the channels 26 located in the correct position.

The stand 12 can be fabricated using any solution. For example, the stand 12 can comprise one or more molded plastic parts or machined parts, which can be permanently or temporarily secured to each other using any of various solutions or fabricated using 3D printing. Embodiments of the stand 12 can be configured to secure the cartridge 14 (e.g., the lower plate 22 of the cartridge 14) at any angle with respect to horizontal. An illustrative range of angles are between −15 and +15 degrees from horizontal. In an embodiment, the stand 12 can be configured to enable the cartridge 14 to be secured at either an upward (positive) angle or a downward (negative) angle.

Returning to FIGS. 2A and 2B, the cartridge 14 can comprise an upper plate 20 and a lower plate 22, which are maintained at a desired separation distance (e.g., gap) from each other. In this case, an internal facing surface of the upper plate 20 and an internal facing surface of the lower plate 22 can form opposing sides of the channel 26. In an embodiment, the channel 26 has an entrance located at a proximal end 20A of the upper plate 20. As used herein, the entrance for the channel 26 is defined by a plane that is perpendicular to the inner facing surface of the lower plate 22 and intersects a bottom of the proximal end 20A of the upper plate. Additionally, the channel 26 can extend to a distal end 20B of the upper plate 20. However, it is understood that this is only illustrative, and the channel 26 can extend any portion of a length of the upper plate 20 between the proximal and distal ends 20A, 20B. Furthermore, the channel 26 can extend straight from the proximal end 20A of the upper plate 20 and/or can include one or more curves, turns, etc., along the length of the upper plate 20. In either case, the channel 26 can have a substantially uniform lateral area and/or a lateral area that varies due to changes in one or more dimensions of the channel 26 along the length of the channel 26.

Each plate 20, 22 can be fabricated from any combination of one or more suitable materials. In an embodiment, at least the upper plate 20 can include one or more transparent regions, which allow relevant radiation to pass there through, so that at least a portion of each channel 26 can be viewed and/or imaged there through. In an embodiment, the upper plate 20 is at least partially formed of a material transparent to visible light, such as glass. However, it is understood that visible light is only illustrative of the radiation that can be used for imaging. Additionally, it is understood that any combination of one or more suitable materials can be used to form the upper plate 20, including glass, fused silica, quartz, polycarbonate, acrylic, etc. In an embodiment, the lower plate 22 is formed from the same material(s) as the upper plate 22. Alternatively, the lower plate 22 can be at least partially formed of a material that reflects, absorbs, and/or the like, the radiation. In this case, the lower plate 22 can provide a background useful for viewing and/or imaging the liquid present in a channel 26. For example, the lower plate 22 can be formed of any of one or more of glass, silicon, metal, composites, ceramic, plastic, etc. A coating can be applied to an internal or external facing surface of the lower plate 22 to provide a visual contrast, such as a contrasting color to a color of the liquid, and/or the like.

In a more particular embodiment, the stand 12 has dimensions corresponding to an internationally recognized standard footprint for microplates (e.g., the Society for Laboratory Automation and Screening (SLAS) standardized microplate footprint). In this case, the cartridge 14 can be sized for use in conjunction with such a stand 12.

The internal facing surface of one or both of the plates 20, 22 and the separation distance between the plates 20, 22 can be configured such that liquid dispensed at the deposition region 22A is pulled into the channel 26 by capillary action. To this extent, a depth (as measured by the distance between the internal facing surfaces at a location of the channel 26 adjacent to the entrance) of the channel 26 at a given location can be approximately 4 millimeters or less, approximately 2 millimeters or less in a more particular embodiment. In still more particular embodiments, the depth can be on the order of 100 microns. However, it is understood that the depth can be even less than 10 microns in embodiments. A lateral width (as measured perpendicular to the depth and the liquid flow direction within the channel) of the channel 26 at a given location can vary significantly depending on the application. In an embodiment, the lateral width is in a range between 50 microns and 2 centimeters. However, it is understood that widths outside of these ranges are possible. An acceptable variance of the actual dimensions of a channel 26 from a stated dimension of the channel 26 also can differ based on the application. In an illustrative embodiment, the acceptable variance of the dimensions of the channel 26 from the stated dimensions are within +/−500 nanometers.

The cartridge 14 can include any mechanism for maintaining the separation distance between the lower plate 22 and the upper plate 20. For example, the cartridge 14 can include a plurality of physical structures, such as ball spacers 28 (e.g., microbeads), which can have diameters corresponding to the desired separation distance between the lower plate 22 and the upper plate 20 and provide a precise spacing. As described herein, the ball spacers 28 and the plates 20, 22 can be held in place using an adhesive or the like.

FIG. 4 shows a perspective view of an illustrative multichannel cartridge 14 according to another embodiment. As illustrated, the upper plate 20 and lower plate 22 can form opposing sides of a plurality of channels 26. The lower plate 22 includes a deposition region 22A which is formed on an extension region 22B that extends beyond a proximal end 20A of the upper plate 20. The extension region 22B can extend any distance beyond the proximal end 20A of the upper plate 20, which can be selected based on the application. In an embodiment, the extension region 22B extends a distance in a range of 2 to 50 mm from the proximal end 20A. As illustrated, the distal end 20B of the upper plate 20 and/or one or both side edges of the upper plate 20 also need not be aligned with the corresponding end/edges of the lower plate 22. Regions of the lower plate 22 that extend beyond the upper plate 20 can be used to, for example, secure the cartridge 14 in a stand, include identification information for the cartridge 14, and/or the like.

The lateral width of each channel 26 can be defined using any solution. For example, the inner facing surface of the lower plate 20 can include a coating 24 that defines the lateral widths and locations of the channels 26. A typical coating 24 has a thickness less than 1 micron to 150 microns. In an embodiment, the coating 24 has a thickness less than 50 microns. In a more particular embodiment, the coating 24 has a thickness less than 25 microns. In an embodiment, the upper plate 20 and lower plate 22 are fabricated of a material having an affinity for the liquid and the coating 24 is located in regions between the channels 26. In this case, the coating can provide a physical and/or repellant barrier to the liquid, thereby containing the liquid within the corresponding channel 26. When the coating 24 does not extend completely across the separation distance between the upper plate 20 and the lower plate 22, the repellant coating can have a width sufficient to prevent liquid from flowing out of the channel 26, e.g., into an adjacent channel. Regardless, the width between the deposition regions 22A of adjacent channels 26 can be configured based on the distance between adjacent dispensing spouts 2A of a corresponding liquid handling device 2. It is understood that alternative configurations for defining the lateral widths and/or locations of the channels 26 are possible. For example, the upper plate 20 and/or lower plate 22 can be fabricated of a material repellant to the liquid and the coating 24 can be used to define the location and lateral extent of each channel.

Figure 5A:
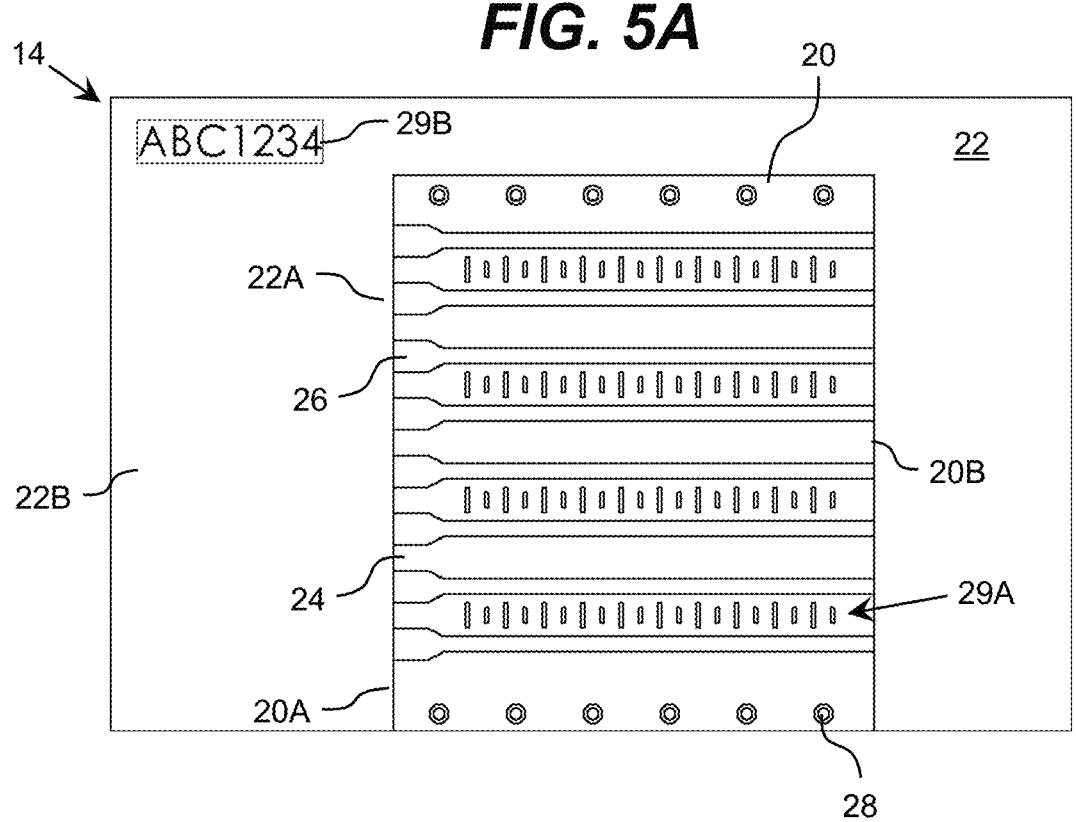
FIGS. 5A-5C show top, side, and detailed side views, respectively, of an illustrative cartridge according to an embodiment.
Figure 5B:
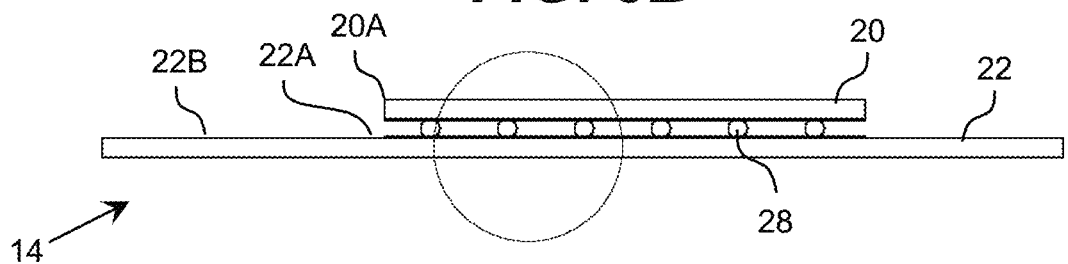
Figure 5C:
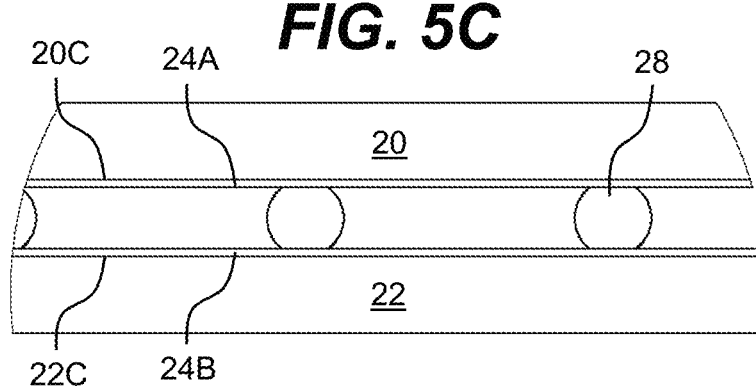

FIGS. 5A-5C show top, side, and detailed side views, respectively, of an illustrative cartridge 14 according to an embodiment. As illustrated, each channel 26 can have a varying lateral width. For example, in this embodiment, each channel 26 is wider at the entrance before tapering to a narrower width. Additionally, each channel 26 is shown extending from the proximal end 20A of the upper plate 20 to the distal end 20B of the upper plate 20. However, as described herein, it is understood that this is only an illustrative configuration of the channels 26, which can have various widths, include one or more turns, and/or the like. Additionally, while all channels 26 are shown having the same configuration, it is understood that a cartridge 14 can include channels with different configurations, e.g., serpentine channels with one or more curves, different variation(s) in lateral width, variation(s) in lateral depth, etc. In an embodiment, the entrances to the channels 26 can be on 9 mm or 4.5 mm center to center spacings, e.g., to match the standard spacings of wells in 96 well or 384 well microplates.

As illustrated in FIG. 5A, the cartridge 14 can include any combination of various markings, which can assist in evaluating the liquid. For example, the cartridge 14 is shown including a set of scale lines 29A (e.g., graduations), which can define one or more physical distances. The scale lines(s) 29A can be configured to enable image data to be scaled properly, indicate corresponding volume(s) in a channel 26, and/or the like. For example, if the liquid fills 20 mm of a 3 mm wide, 100 micron deep channel 26, the volume of liquid is about 6 microliters. The scale lines 29A can be located on an outside of the cartridge 14 (e.g., on an external face of the upper plate 20) or on an internal facing surface of one of the upper plate 20 or the lower plate 22. For example, the scale lines 29A can be applied in the coating 24 by photolithography. For visual inspection, each channel 26 of the cartridge 14 can include scale lines 29A visually associated therewith. For example, the cartridge 14 can include one or more scale lines 29A that are immediately adjacent to each channel 26 and/or intersect and extend through each channel 26. In either case, the physical distance(s) defined by the scale lines 29A can correspond to one or more volumes of the liquid within the channels 26.

Additionally, the cartridge 14 can include identification data 29B for the cartridge 14. The identification data 29B can allow the cartridge 14 to be tracked. For example, when an actual separation distance between the plates 20, 22 varies among cartridges, the identification data 29B can enable the actual distance to be correlated with the cartridge 14. To this extent, the identification data 29B can include one or more codes, which can contain the separation distance (e.g., gap) dimensions in several locations of the cartridge 14. The gap may be measured, for example, using interferometry, imaging of the cartridge 14 on edge, and/or the like. Such information can enable a computer system to interpolate or extrapolate the gap for every coordinate on the cartridge 14. Additionally, the cartridge 14 can contain a formula that specifies the gap for every coordinate or channel on the cartridge. Alignment marks also can be on one or both plates 20, 22.

As illustrated, the separation distance between the top plate 20 and the bottom plate 22 can be maintained using a plurality of structures, such as ball spacers 28 located between the outer lateral sides of the plates 20, 22. It is understood that structures, such as the ball spacers 28 can be located anywhere between the plates 20, 22 where the channels 26 are not present. In the illustrated embodiment, the ball spacers 28 can be partially embedded in the coating 24 that defines the lateral extent of the channels 26. The coating 24 can comprise a material that the ball spacers 28 penetrate to contact the corresponding plates 20, 22. In this manner, the separation distance between the plates 20, 22, and therefore the corresponding depth of the channels 26, can be accurately controlled. Alternatively, the coating 24 can include openings, holes, or other regions where there is no coating and the ball spacers 28 can be placed in these areas to define the separation distance without any potential effects from the coating 24.

As illustrated most clearly in FIG. 5C, the internal facing surface 20C, 22C of each plate 20, 22 can include a coating 24A, 24B, respectively. The coatings 24A, 24B can provide a hydrophobic (for aqueous liquids) or lipophobic (for oil-based liquids) surfaces, which prevent the liquid from spreading across their surfaces. To this extent, as illustrated in FIG. 5C, the coatings 24A, 24B do not need to contact each other to provide a physical barrier across an entire depth of the channels 26. While the cartridge 14 is shown including repellant coatings 24A, 24B with internal facing surfaces having an affinity for the liquid, it is understood that an embodiment of the cartridge 14 can include coatings having an affinity for the liquid with internal facing surfaces 20C, 22C that repel the liquid. For example, for an aqueous solution, the plates 20, 22 can be plastic, coated in regions to be hydrophilic, and/or the like.

Regardless, the coatings 24A, 24B can be patterned extremely accurately using current technology, such as a photoresist, patterned using photolithography, etc. One or both of the coatings 24A, 24B can be transparent, opaque or translucent. Additionally, misalignment of the coatings 24A, 24B deposited on the opposing internal facing surfaces 20C, 22C of the plates 20, 22 can be determined. For instance, for transparent coatings 24A, 24B, a dye will not appear as dark in regions where the dye does not completely fill the gap, as it would in a region in which the coating on one wall does not overlap a coating on the opposite wall. For opaque coatings 24A, 24B known to be patterned very accurately, a difference between a measured lateral width of a transparent region versus the known patterned width (e.g., 1.9 mm versus 2.0 mm) can be presumed to be the result of misalignment (e.g., 0.1 mm). A measurement system (e.g., the computer system 19 shown in FIG. 1) can employ a compensation technique to accurately estimate the hidden volume of liquid. The measurement system can employ similar compensation solutions for transparent and translucent coatings.

Figure 6A:
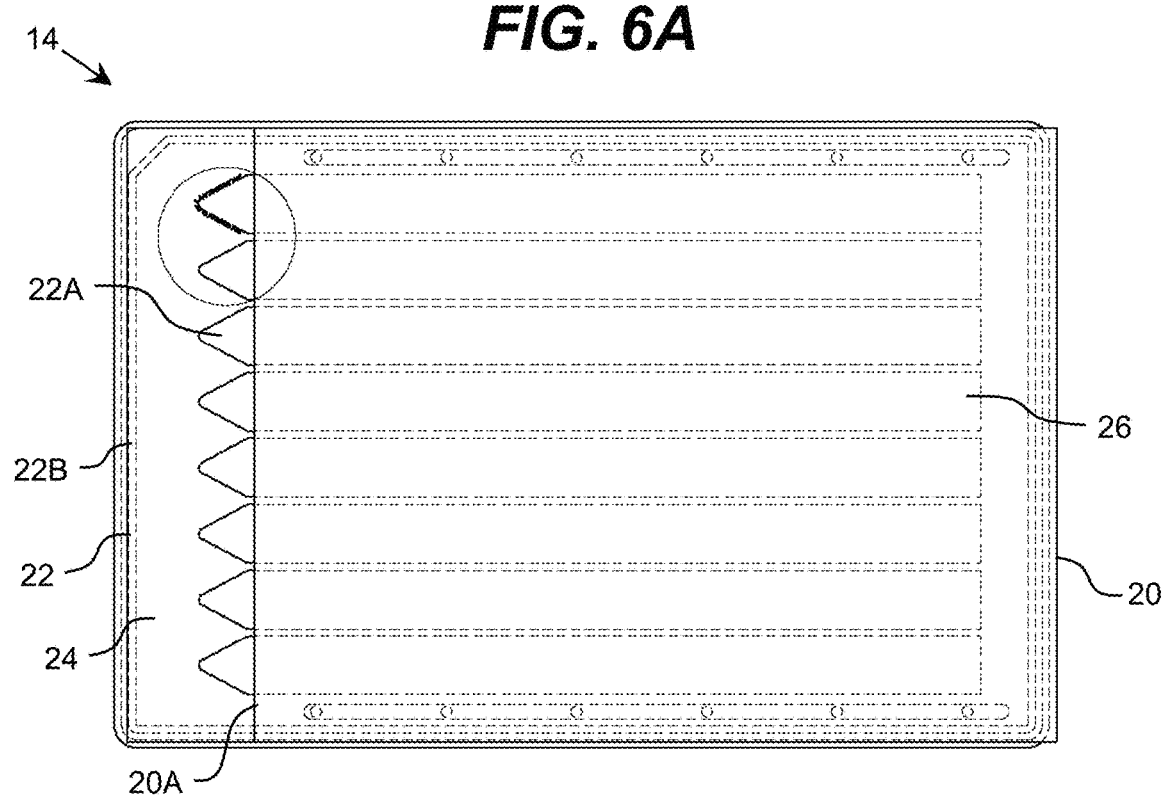
Figure 6B:
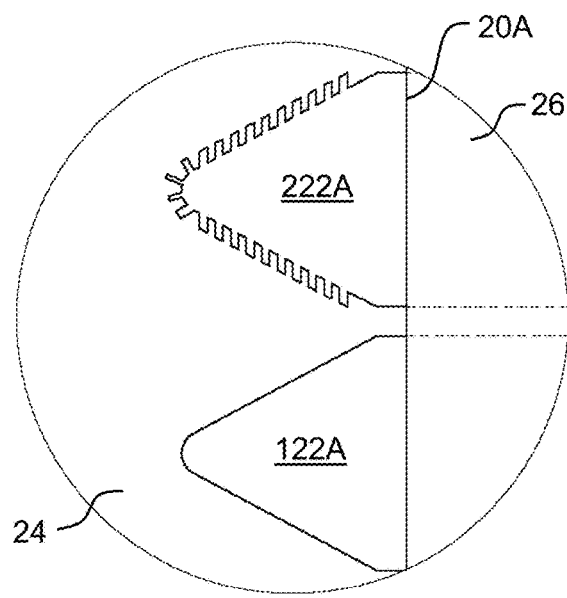

FIGS. 6A and 6B show top and detailed top views, respectively, of an illustrative cartridge 14 according to an embodiment. As illustrated, the extension region 22B of the lower plate 22 can include one or more attributes that at least partially define an extent of the deposition region 22A in the extension region 22B. In an embodiment, the extent of the deposition region 22A in the extension region 22B in one or more directions is defined by a boundary with a set of areas of a repellant barrier located on the extension region 22B, which are configured to be repellant to the liquid to be dispensed in the deposition region 22A. In this case, during use, liquid is dispensed onto the deposition region 22A, forming droplets by the entrance to the channel 26 at the proximal end 20A of the upper plate 20. As a volume of the liquid dispensed onto the deposition region 22A increases, the droplets grow and the liquid will spread over the surface area of the deposition region 22A. At least partially bound by the repellant area(s) of the extension region 22B, the liquid stops and spreads toward the entrance to the channel 26, contacting the upper plate 20. As the channel 26 has an affinity to the liquid, the liquid will be drawn into the channel 26.

In an illustrative embodiment, the extent of the deposition region 22A is at least partially defined using a repellant coating 24 as described herein. In particular, in addition to defining the lateral widths of the channels 26 of the cartridge 14, the repellant coating 24 can be deposited on areas of the extension region 22B to define some or all of the extent of the deposition region 22A, without creating a physical barrier of any significant height. In an embodiment, the repellant coating 24 has a shallow height that is no more than 150 microns. In an embodiment, the height of the repellant coating 24 is less than the depth of the entrance of the channel 26. In a more particular embodiment, the height of the repellant coating 24 is less than half (less than a tenth in an even more particular embodiment) than the depth of the entrance of the channel 26. In an embodiment, the repellant coating 24 can create a visual distinction between the deposition region 22A and the remaining extension region 22B to facilitate proper placement of the liquid handling device when using the cartridge 14 to evaluate liquid.

It is understood that this configuration is only illustrative of numerous approaches that can be used to define some or all of the extent of the deposition region 22A. For example, in another embodiment, a coating having an affinity to the liquid is applied on the extension region 22B of the lower plate 22 (which can be repellant to the liquid) to create a repellant barrier that defines the extent of the deposition region 22A. In this case, the coating also can have a shallow height of no more than 150 microns. Other approaches for defining the extent of the deposition region 22A in a direction include application of a physical barrier (e.g., a structure having a height that equals or exceeds the separation distance between the plates 20, 22) on the lower plate 22 or creation of a physical repellant barrier, such as a barrier groove having a sharp transition, on the extension region 22B of the plate 22.

Figure 6C:
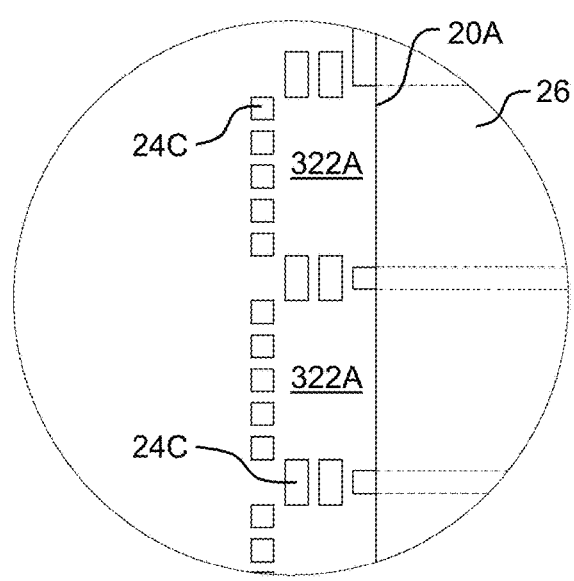
FIG. 6C shows a detailed top view of deposition regions according to another embodiment.

As illustrated most clearly in FIG. 6B, an extent of a deposition region, such as the deposition region 122A, can be defined by smooth edges, or an extent of a deposition region, such as the deposition region 222A, can be defined by one or more textured edges. The textured edge(s) can be formed using any solution. For example, a textured edge can comprise a series of notches, points, teeth, and/or the like, which create a jagged or serrated boundary between the deposition region 222A and the remaining portion of the extension region 22B. In an embodiment, the textured edge of a boundary can be defined by a series of disjoint regions (e.g., repellant regions or physical barriers). For example, the series of notches shown for defining the extent of the deposition region 222A can be disjoint. FIG. 6C shows a detailed top view of deposition regions 322A according to another embodiment. In this case, the textured edges of the deposition regions 322A are formed by disjoint regions of the repellant coating 24C. In this case, the regions of repellant coating 24C are spaced sufficiently close so that the surface tension of the liquid does not enable the liquid to squeeze between the disjoint regions of repellant coating 24C.

Regardless, a deposition region 22A (e.g., deposition regions 122A, 222A) can have a generally rounded triangular shape. However, it is understood that this is only illustrative of various possible shapes for the deposition region 22A. For example, a deposition region can be semielliptical (e.g. semicircular), or some or all of any of various polygonal shapes (e.g., a trapezoidal shape of deposition region 322A). In an embodiment, a deposition region 22A has substantially the same lateral width as the corresponding channel 26 at the boundary between the deposition region 22A and the entry region of the channel 26. However, it is understood that the deposition region 22A can be wider or narrower than the entry region of the channel 26. The deposition region 22A can comprise any suitable dimensions, which can be selected based on the size of the channel 26, amount of liquid to be dispensed and evaluated using the channel 26, attributes of the liquid, etc. In an illustrative embodiment, the deposition region 22A has lateral dimensions in a range of 1 to 20 mm and covers a surface area of approximately 2 to 200 mm$^2$.

Figure 7A:
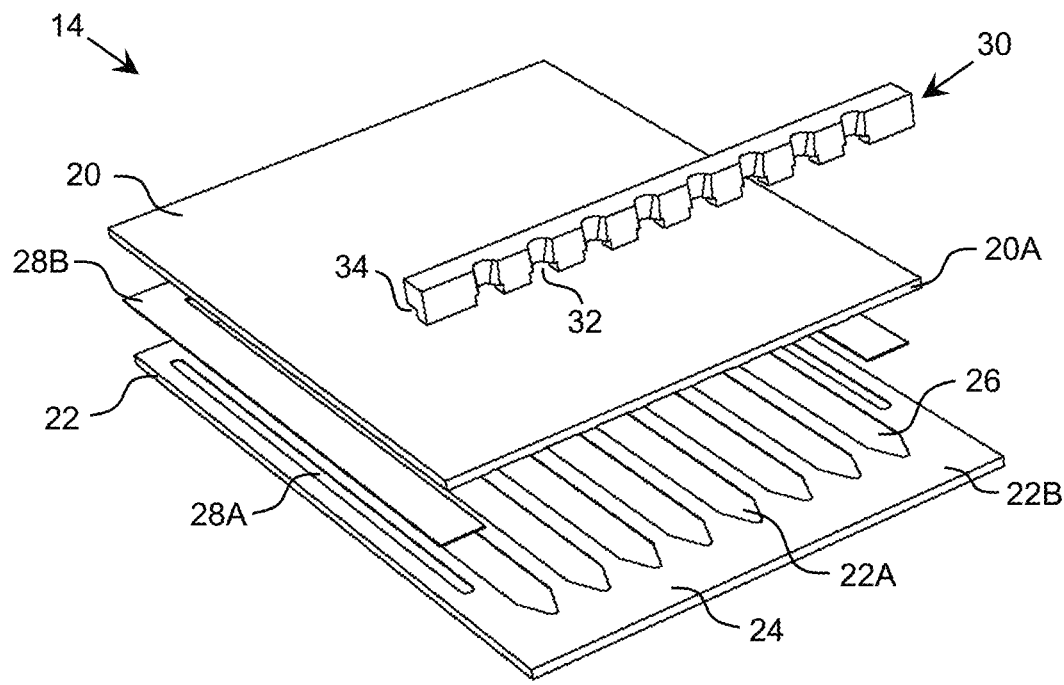
FIGS. 7A and 7B show exploded perspective and perspective views, respectively, of an illustrative cartridge according to an embodiment.
Figure 7B:
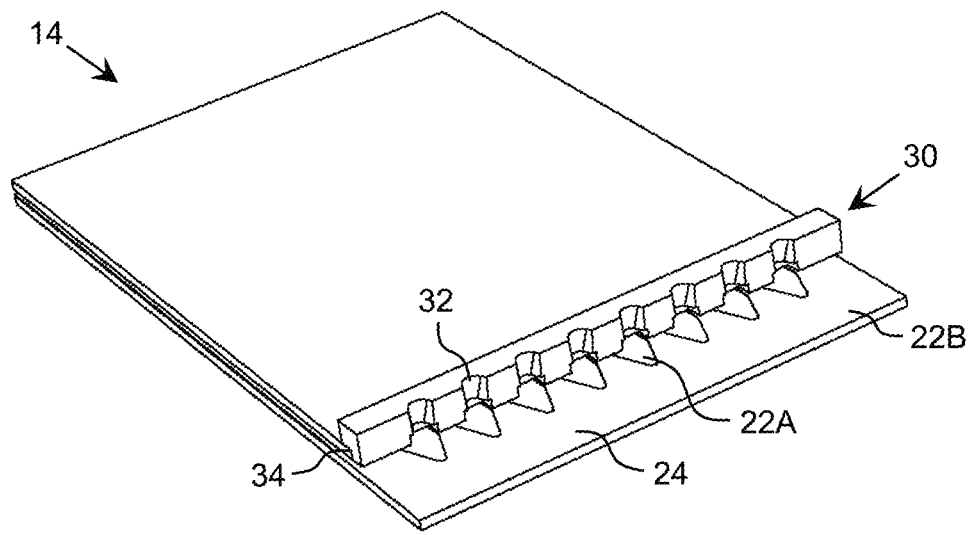

FIGS. 7A and 7B show exploded perspective and perspective views, respectively, of an illustrative cartridge 14 according to an embodiment. The cartridge 14 illustrates use of a set of structures 28A and an adhesive 28B, which can be used to secure the plates 20, 22 to each other at a desired separation distance. The set of structures 28A can comprise a series of ball spacers as described herein or a comparable structure capable of maintaining the desired separation distance between the plates 20, 22, such as a chemically etched metal, one or more protrusions (e.g., pillars) molded or deposited onto the internal facing surface of one or both of the plates 20, 22, and/or the like. The set of structures 28A can be embedded in the adhesive 28B to keep the set of structures 28A in a desired location and/or adhere the inner facing surfaces of the plates 20, 22 to one another and control the separation distance. The adhesive 28B can comprise any type of adhesive, such as a die cut adhesive, a sealant, and/or the like.

The cartridge 14 further includes a guide block 30, which can assist in properly aligning the liquid handling device for dispensing the liquid in the deposition region 22A and/or directly into the channel 26. In particular, the guide block 30 can include a guide notch 32 for a channel 26 in the cartridge 14. As illustrated, the guide notch 32 can comprise an inwardly curved surface that provides a mechanical backstop for guiding a dispensing spout (e.g., a pipette tip) with respect to the corresponding channel 26. The guide notch 32 can be semielliptical (e.g., semicircular), or angled (e.g., V-shaped). A surface of the guide notch 32 can be substantially vertical or angled off of vertical. The guide block 30 can be configured to be placed immediately adjacent to the proximal end 20A of the top plate 20. As illustrated, the guide block 30 can include an angled base 34 which can enable the guide block 30 to contact both the proximal end 20A and an outer surface of the top plate 20 and be adhered to one or both of the surfaces. However, it is understood that this is only illustrative and the guide block 30 can be configured to contact the lower plate 22 in addition to or as an alternative to contacting the upper plate 20. While the guide block 30 is shown including a guide notch 32 for each channel 26 of the cartridge 14, it is understood that only a portion of the channels 26 can include a guide notch 32. For example, a guide notch 32 can be included for one channel 26 on either side of the cartridge 14. In this case, dispensing spouts located between the two guide notches 32 will be properly aligned when the corresponding dispensing spouts are aligned with the channels 26 corresponding to the two guide notches 32.

Figure 8A:
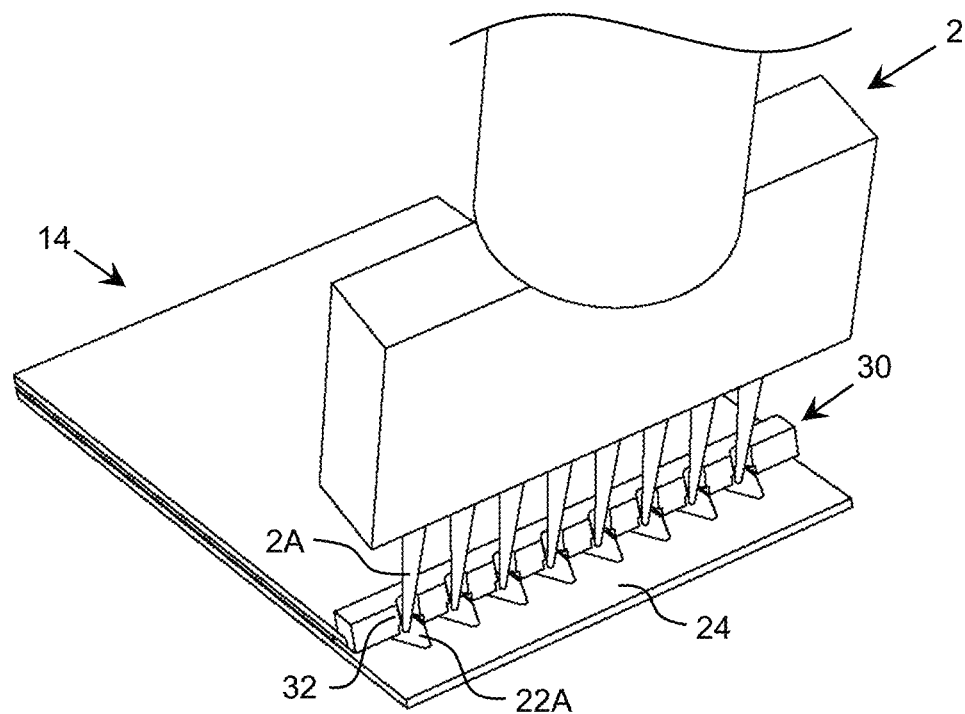
FIGS. 8A-8D show perspective, side, and detailed side and side cross-section views, respectively, illustrating use of a liquid handling device in conjunction with the cartridge of FIGS. 7A and 7B according to an embodiment.

FIGS. 8A-8D show perspective, side, and detailed side and side cross-section views, respectively, illustrating use of a liquid handling device 2 in conjunction with the cartridge 14 of FIGS. 7A and 7B according to an embodiment. As shown in FIG. 8A, the liquid handling device 2 can comprise a multichannel pipette, which can concurrently dispense liquid from each of a plurality of dispensing spouts 2A. The guide block 30 can enable a user of the liquid handling device 2 to position each of the dispensing spouts 2A into the guide notch 32 and therefore above the deposition region 22A of the corresponding channel in the cartridge 14 to facilitate dispensing the liquid in a location close to an entrance of the corresponding channel. As illustrated, an extent of each deposition region 22A can be at partially defined by a repellant barrier 24 having a shallow height or depth, which enables the dispensing spouts 2A to be readily located at a desired location without needing to avoid any protruding physical structure.

Figure 8B:
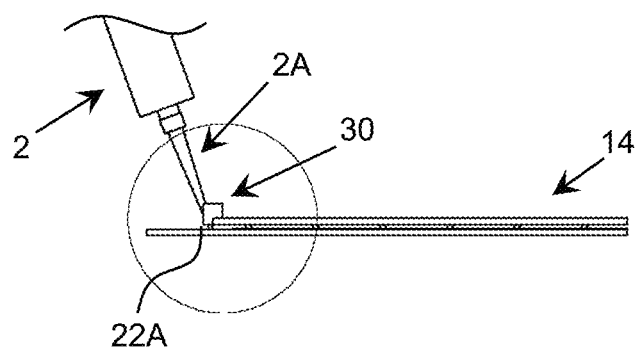
Figure 8C:
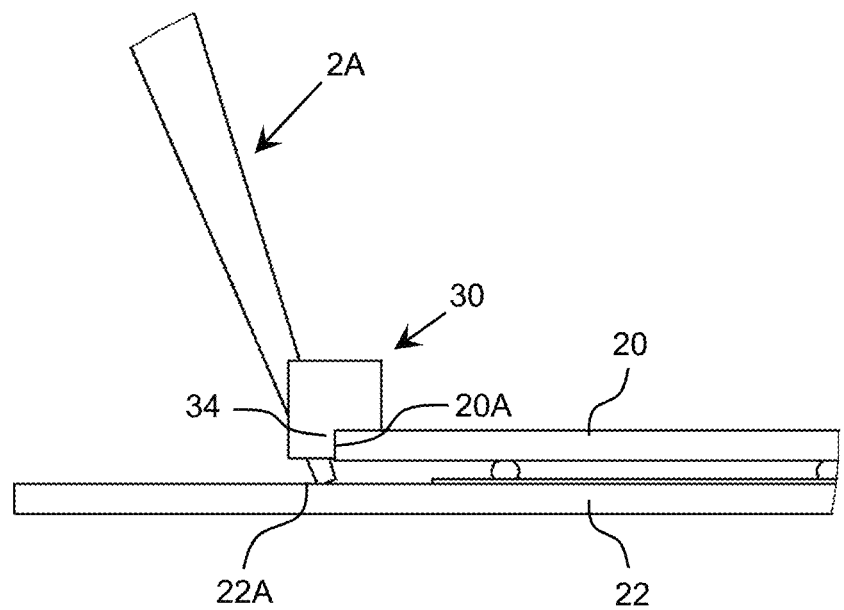
Figure 8D:
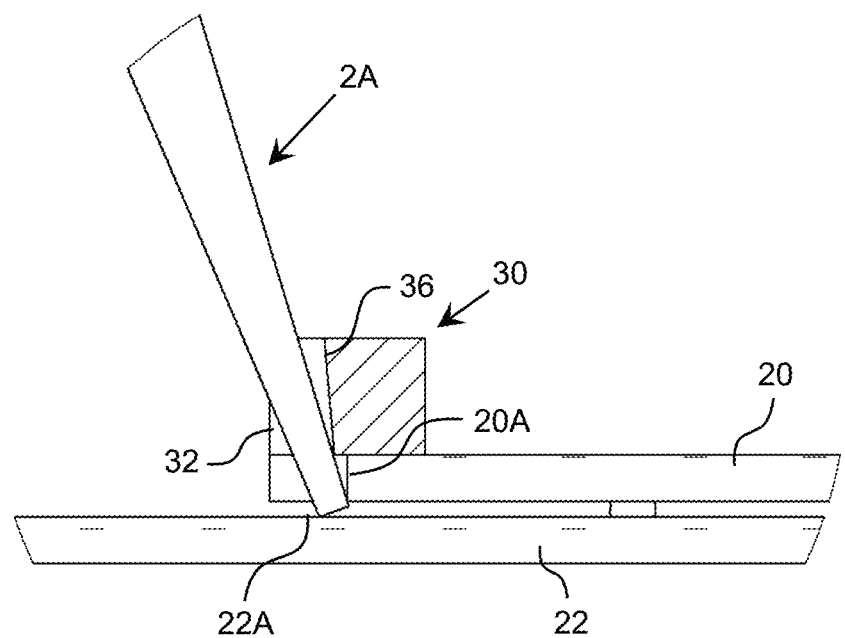

FIGS. 8B-8D illustrate how the liquid handling device 2 can be angled away from the cartridge 14, which enables the end of the dispensing spout 2A to be located closer to the entrance for the corresponding channel and can rest against the channel entrance. FIG. 8C shows a detailed side view illustrating how the dispensing spout 2A is located within the guide notch 32 of the guide block, while FIG. 8D shows a detailed side cross-section view illustrating an illustrative interior of the guide notch 32 with the dispensing spout 2A located therein. As illustrated, the guide notch 32 can have a non-vertical face 36, which can further assist in locating the dispensing spout 2A. As illustrated, the non-vertical face 36 of the guide notch 32 can form an acute angle with respect to a surface of the deposition region 22A. Additionally, an innermost extent of the non-vertical face 36 of the guide notch 32 can be located beyond the proximal end 20A of the upper plate 20, above the deposition region 22A. The angle and/or direction of the angle (i.e., acute or obtuse) of the non-vertical face 36 of the guide notch 32 as well as a size and extent of the guide notch 32 can be selected based on the dimensions and intended use of the corresponding liquid handling device with which the cartridge 14 is configured for use. To this extent, embodiments can include non-vertical faces 36 forming an acute angle with the surface of the deposition region 22A between 5 degrees and 75 degrees.

Figure 9A:
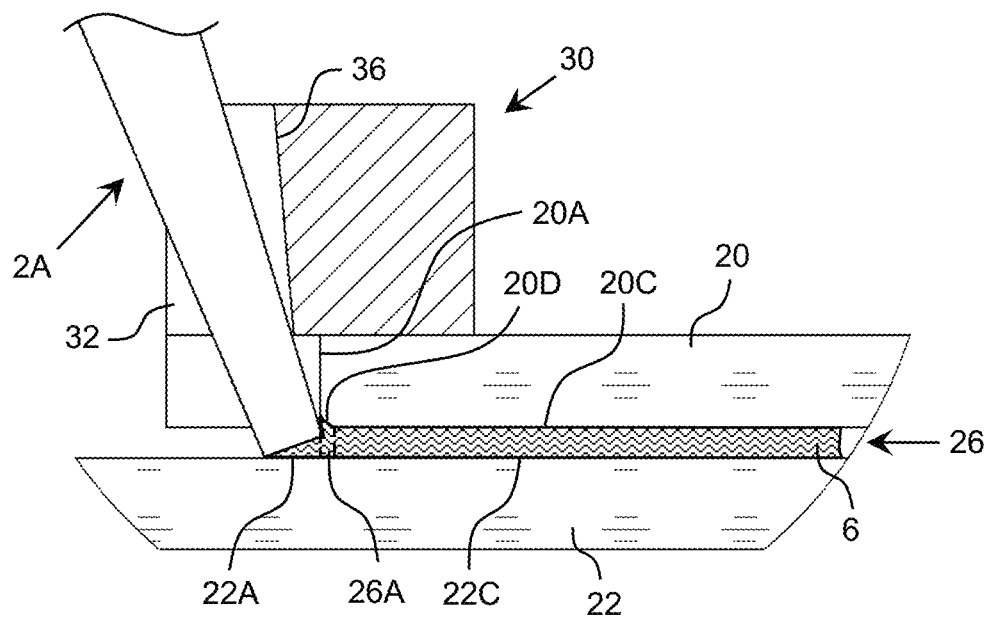
FIGS. 9A and 9B show detail views of illustrative entrance regions for a channel according to embodiments.
Figure 9B:
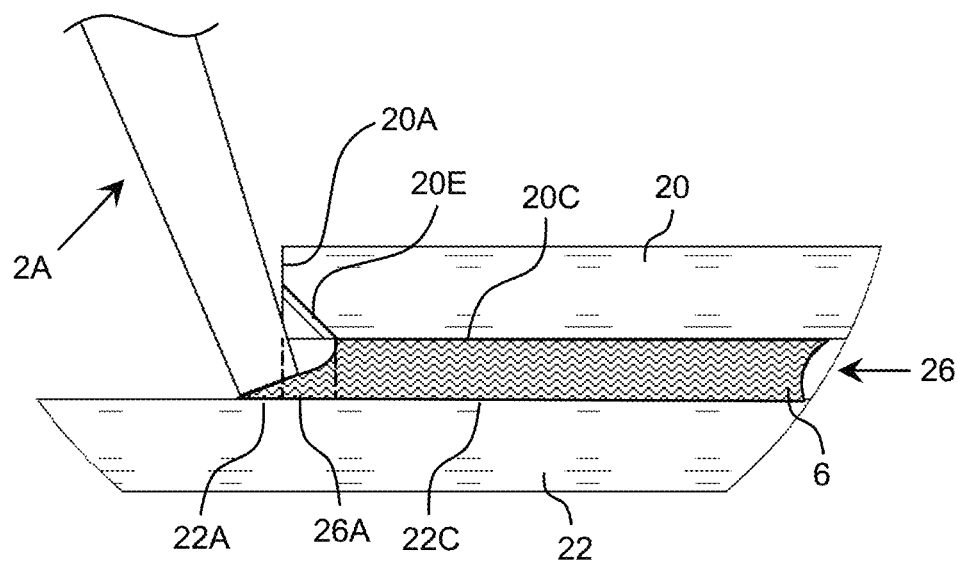

An embodiment of a cartridge described herein can include a channel with an entrance region configured to help draw the liquid into the channel and/or assist in guiding a dispensing spout of the liquid handling device to the entrance region. As used herein, the entrance region for a channel 26 is a portion of the channel 26 that starts at the entrance to the channel 26 and includes one or more attributes that differ from the primary extent of the channel 26. In an embodiment, the channel 26 is configured such that liquid is not located in the entrance region when being evaluated. FIGS. 9A and 9B show detail views of illustrative entrance regions 26A (indicated by dashed lines) for a channel 26 according to embodiments. In FIG. 9A, the entrance region 26A for the channel 26 is defined by the portion of the channel extending between the entrance to the channel 26 (e.g., the proximal end 20A of the top plate 20) and a plane that is perpendicular to the inner facing surface 22C of the lower plate 22 and intersects a location on the inner facing surface 20C of the upper plate 20 at which a tapered entrance surface 20D of the top plate 20 ends. The guide notch 32 can assist with locating the dispensing spout 2A at the entrance of the channel 26.

Similarly, in FIG. 9B, the entrance region 26A for the channel 26 is defined by planes corresponding to the proximal end 20A of the top plate 20 and an end of a tapered entrance surface 20E on the inner facing surface 20C of the top plate 20. As illustrated, the taper can be a smooth, rounded taper (e.g., a fillet), such as the tapered entrance surface 20D, or an angled taper (e.g., a chamfer or bevel), such as the tapered entrance surface 20E. In either case, the tapered entrance surface 20D, 20E causes a depth of the entrance region 26A (as measured by the average distance between the tapered entrance surface and the lower plate 22) to be larger than a depth of the channel 26, at least at a boundary between the end of the entrance region 26A and the start of the primary extent of the channel 26 (e.g., the location at which the tapered entrance surface 20D, 20E ends). A relatively small tapered entrance surface, such as the tapered entrance surface 20D, can help draw the liquid 6 into the channel 26, while a larger tapered entrance surface, such as the tapered entrance surface 20E, can further act as a guide notch to assist in guiding the dispensing spout 2A of the liquid handling device to the entrance region 26A of the channel 26.

The amount and/or shape of the tapering can be selected based on any of numerous factors including, for example, the dimensions of a dispensing spout 2A of a liquid handling device which may be used to dispense the liquid 6 into the channel 26. As illustrated, the tapered entrance surface 20D, 20E of the upper plate 20 can extend approximately the same depth as the widened distance. A curved angle can define the tapered entrance surface 20D. The tapered entrance surface 20D, 20E can have an affinity for the liquid 6. Inclusion of the tapered entrance surface 20D, 20E can help to ensure that all the liquid 6 enters the channel 26.

Figure 10A:
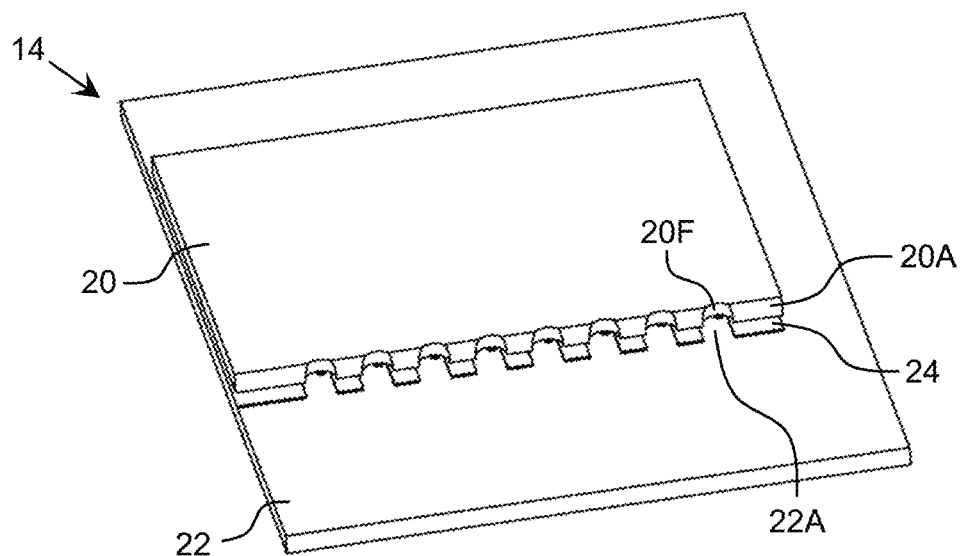
FIGS. 10A and 10B show a perspective view and a detailed top view of an illustrative cartridge according to an embodiment.
Figure 10B:
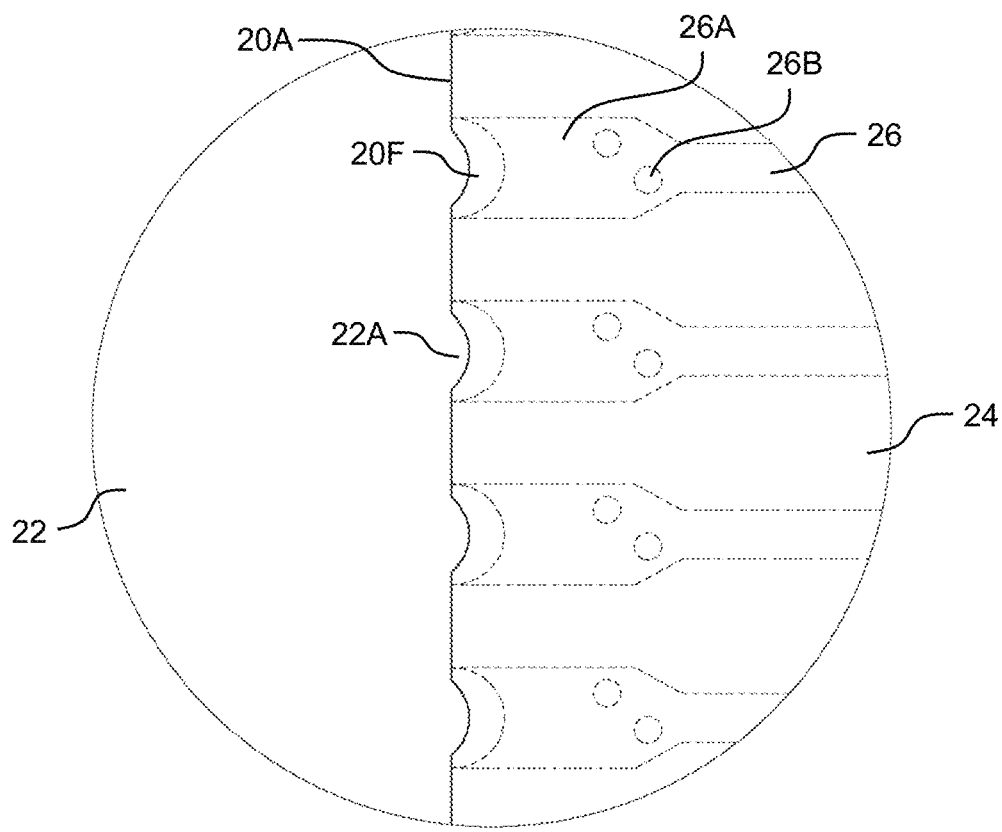
Figure 11A:
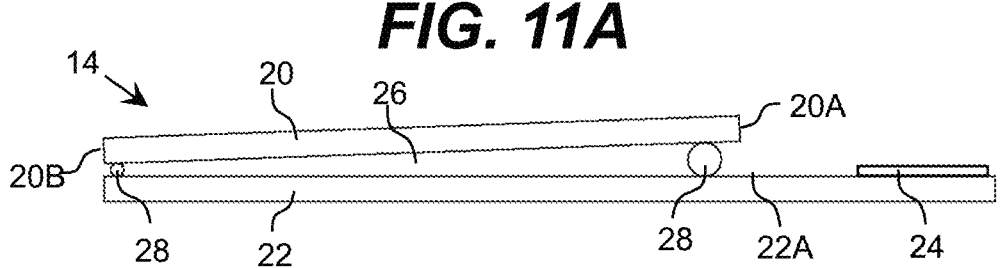
FIGS. 11A-11E show an illustrative cartridge and a volume of liquid dispensed in a channel of the cartridge according to an embodiment.
Figure 11B:
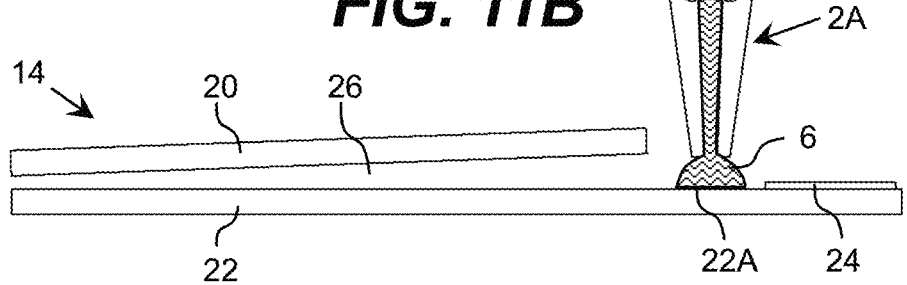
Figure 11C:
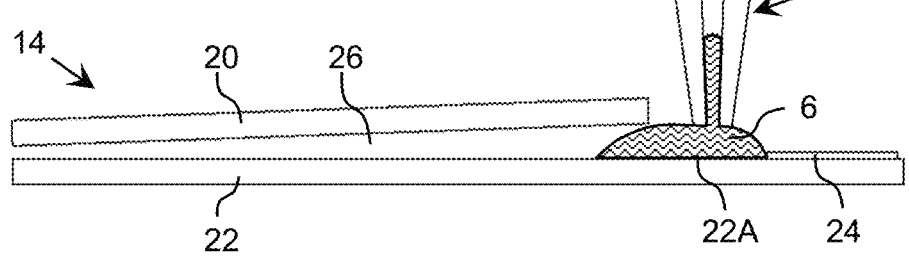
Figure 11D:
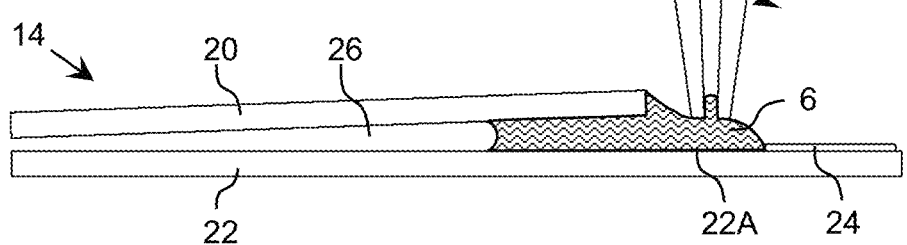
Figure 11E:
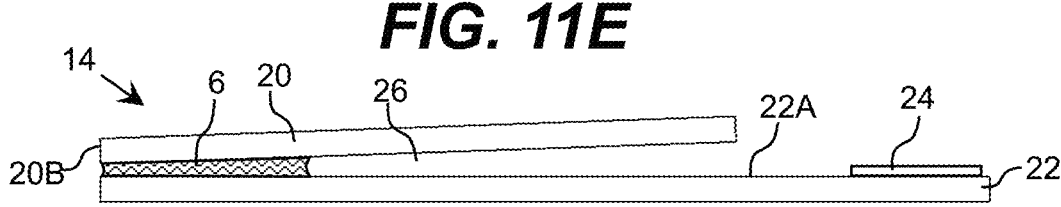

The deposition region and/or the entrance region of the channel can include one or more other attributes, which are configured to ensure proper dispensing of liquid 6 into a corresponding channel 26. For example, FIGS. 10A and 10B show a perspective view and a detailed top view of an illustrative cartridge according to an embodiment. As illustrated, the proximal end 20A of the upper plate 20 can include an entrance notch 20F for a corresponding channel 26, which can be configured similar to the guide notch described herein. To this extent, the entrance notch 20F can comprise an inwardly curved (e.g., semielliptical) surface that extends over the deposition region 22A for the channel 26 to assist in proper placement of a dispensing spout with respect to the entrance region 26A for the channel 26. As shown in FIG. 10B, the entrance notch 20F can have a non-vertical face, which can further assist in locating the dispensing spout. As illustrated, the non-vertical face of the entrance notch 20F can form an acute angle with respect to the deposition region 22A. The angle and/or direction of the angle (i.e., acute or obtuse) of the entrance notch 20F as well as a size and extent of the entrance notch 20F can be selected based on the dimensions and intended use of the corresponding liquid handling device with which the cartridge 14 is configured for use. To this extent, embodiments can include non-vertical faces of the entrance notch 20F forming an acute angle with the surface of the deposition region 22A between 5 degrees and 75 degrees.

As illustrated in FIG. 10B, the entrance region 26A of the channel 26 can be defined as starting at the entrance to the channel 26 and ending after the transition to a smaller lateral width of the channel 26. Additionally, the entrance region 26A can include one or more obstructions 26B which are configured to ensure that any air bubbles do not enter the channel 26 beyond the entrance region 26A. For example, the entrance region 26A is shown including a set of obstructions 26B. Obstructions 26B can be located on one or both of the inner facing surfaces of the lower plate 22 or the upper plate 20. An obstruction 26B can extend partially across the separation distance between the plates 20, 22, or can extend completely across and contact both plates 20, 22. In an embodiment, an obstruction 26B comprises an area of a repellant coating, which can comprise the same material and have the same width as used for a coating 24 that defines the lateral widths and locations of the channels 26.

An embodiment of a cartridge described herein can include one or more other attributes for causing a volume of liquid to move to a desired location. For example, a cartridge 14 can be configured such that the channel 26 has a depth that varies along some or all of the length of the channel 26. FIGS. 11A-11E show an illustrative cartridge 14 and a volume of liquid 6 dispensed in a channel 26 of the cartridge 14 according to an embodiment. In this case, the depth of the channel 26 tapers from the proximal end 20A of the upper plate 20 to the distal end 20B of the upper plate 20. Such a configuration can be implemented, for example, by using ball spacers 28 having different sizes. For example, the ball spacers 28 located near the proximal end 20A can be larger than the ball spacers 28 located near the distal end 20B. In an embodiment, the ball spacers 28 or similar structure(s), can be located along the proximal and distal ends 20A, 20B of the upper plate 20, e.g., in regions between the channels 26. However, it is understood that this is only illustrative of various possible configurations including the use of a tapered structure, structures of three or more different sizes, etc.

In an embodiment, a depth of the channel 26 at the proximal end 20A of the upper plate 20 can be larger than (e.g., approximately twice as much as) a depth of the channel 26 at the opposing end of the channel 26, e.g., the distal end 20B of the upper plate 20. However, it is understood that this is only illustrative and the depth can vary by any desired amount, including by amounts much smaller than the variation shown in FIG. 11A. Regardless, the variation exceeds unintended variations that may result from the limits of a manufacturing process utilized to form the cartridge 14. Additionally, the depth of the channel 26 can increase in a direction away from the proximal end 20A rather than decreasing as illustrated. The varying depth also can increase the surface to volume ratio of liquid in the channel 26. As illustrated in FIGS. 11B-11E, as the liquid 6 is dispensed in the deposition region 22A, the liquid 6 can move toward the proximal end 20A of the upper plate, e.g., due to the repellant coating 24 (or other type of barrier), and enter the channel 26. Surface tension can cause the liquid 6 to wick to the shallow end of the channel 26 away from the deposition region 22A (and entrance) of the channel 26. In an embodiment, the varying depth can be implemented by securing the plates 20, 22 at an angle with respect to each other. In another embodiment, one or both plates 20, 22 can include one or more bends, graded surfaces, and/or the like, such that at least a portion of the channel 26 has a depth that changes along at least a portion of the channel 26.

An embodiment of the cartridge 14 can enable the analysis of larger volumes of liquid than some prior art approaches. For example, capillary action can be effective for channels having rectangular cross-sections that are much wider than they are tall, thereby incorporating a greater volume between two plates than that of a circular duct in a capillary over the same length. To this extent, embodiments of the cartridge 14 can be used to analyze an accuracy of liquid volumes dispensed by liquid handling devices with volumes in a range of 200 microliters to 1 milliliter or more.

While shown and described herein as a liquid evaluation system, it is understood that aspects of the invention further provide various alternative embodiments. For example, in one embodiment, the invention provides a process for evaluating an accuracy of a single or multichannel liquid handling device (e.g., a pipette) and/or an accuracy of a liquid handling device operator (human or robotic), using a system described herein. Such a process can include instructing a liquid handling device operator to dispense a predetermined volume of liquid using a liquid handling device into one or more channels of a cartridge described herein and measuring an accuracy of the volume(s) of liquid actually dispensed into the channel(s). This process can be repeated one or more times using different cartridges and/or different channels in a cartridge. The measurement can be performed by a computer system using image data acquired of the cartridge and/or performed by a human.

In another embodiment, the invention provides a process for evaluating one or more attributes of a volume of liquid dispensed into a channel of a cartridge described herein. The liquid can comprise a sample, a treated sample, and/or the like, for which data regarding one or more of a color or a clarity, can be correlated with one or more other attributes of the volume of liquid. In this case, multiple samples and/or one or more control samples can be placed in distinct channels of a cartridge described herein and compared concurrently. Additionally, controlled ambient conditions, such as lighting, temperature, ventilation, and/or the like, can provide suitable data for comparing different samples imaged at different times. Data regarding one or more of the ambient conditions can be used to normalize samples acquired and imaged at different times for proper comparison.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for evaluating a volume of a liquid, the system comprising:
    a device comprising a channel for holding the volume of liquid, the device comprising:
        an upper plate;
        a lower plate, wherein the lower plate includes an extension region that extends beyond a proximal end of the upper plate;
        means for maintaining a separation distance between the lower plate and the upper plate, wherein an internal facing surface of the lower plate and an internal facing surface of the upper plate form opposing sides of a channel having an entrance at the proximal end of the upper plate, wherein the extension region includes a deposition region that is located beyond the proximal end of the upper plate and borders the entrance for the channel; and
        a repellant barrier at least partially defining an extent of the deposition region in the extension region, wherein the repellant barrier has a height or depth less than the separation distance at the entrance for the channel.

2. The system of claim 1, wherein the deposition region is configured to have an affinity for the liquid, and wherein the repellant barrier comprises a set of areas configured to be repellant to the liquid.

3. The system of claim 2, wherein the set of areas comprise a plurality of disjoint areas of a repellant coating.

4. The system of claim 1, wherein the deposition region has a rounded triangular shape in the extension region.

5. The system of claim 1, wherein at least a portion of the extent of the deposition region in the extension region is defined by a textured edge creating a jagged or serrated boundary.

6. The system of claim 1, the device further comprising a notch located adjacent to the deposition region, wherein the notch has a non-vertical face that forms an acute angle with a surface of the deposition region.

7. The system of claim 6, wherein the notch is formed by a guide block located immediately adjacent to the proximal end of the upper plate.

8. The system of claim 1, wherein the separation distance between the first plate and the second plate causes the liquid to be pulled into the entrance for the channel and the channel by capillary action.

9. The system of claim 1, wherein a separation distance between the first plate and the second plate at the proximal end of the upper plate is larger than a separation distance between the first plate and the second plate at a distal end of the upper plate.

10. The system of claim 1, wherein the upper plate includes a tapered entrance surface forming an entrance region of the channel.

11. The system of claim 1, wherein the channel includes an entrance region with a set of obstructions.

12. The system of claim 11, wherein the set of obstructions comprise at least one island repellant to the liquid.

13. The system of claim 1, wherein at least one of the upper or lower plate, includes a plurality of markings for measuring the volume of the liquid in the channel.

14. The system of claim 1, wherein the device further comprises a stand, wherein the lower plate is secured in position on the stand at an angle with respect to horizontal.

15. The system of claim 14, wherein the angle causes the deposition region to be higher than the channel.

16. A system for measuring a volume of a liquid, the system comprising:
    a device comprising a channel for holding the volume of liquid, the device comprising:
        an upper plate;
        a lower plate, wherein the lower plate includes an extension region that extends beyond a proximal end of the upper plate;
        a set of physical structures for maintaining a separation distance between the lower plate and the upper plate, wherein an internal facing surface of the lower plate and an internal facing surface of the upper plate form opposing sides of a channel having an entrance at the proximal end of the upper plate, wherein the extension region includes a deposition region that is located beyond the proximal end of the upper plate and borders the entrance for the channel, and wherein at least one of the upper or lower plate includes a plurality of markings for measuring the volume of the liquid in the channel; and a repellant barrier at least partially defining an extent of the deposition region in the extension region, wherein the repellant barrier has a height or depth less than the separation distance at the entrance for the channel.

17. The system of claim 16, wherein the device further comprises a notch located adjacent to the deposition region, wherein the notch has a non-vertical face that forms an acute angle with a surface of the deposition region.

18. The system of claim 16, further comprising an imaging device configured to image the liquid in the channel through at least one of the upper plate or the lower plate.

19. The system of claim 16, further comprising a computer system configured to determine the volume of the liquid in the channel.

20. A method of evaluating a volume of a liquid, the method comprising:

securing at least one of an upper plate or a lower plate of a device in a desired position, wherein the upper plate and lower plate are secured to each other with a separation distance between the lower plate and the upper plate, wherein an internal facing surface of the lower plate and an internal facing surface of the upper plate form opposing sides of a channel having an entrance at a proximal end of the upper plate, and wherein an extension region of the lower plate extends beyond the proximal end of the upper plate;

locating a dispensing spout over a deposition region located on the extension region of the lower plate, wherein the deposition region borders the entrance of the channel and an extent of the deposition region in the extension region is at least partially defined by a repellant barrier having a height or depth less than the separation distance at the entrance for the channel, wherein the locating includes moving a dispensing spout over the repellant barrier;

dispensing the volume of the liquid onto the deposition region; and evaluating at least one attribute of the liquid in the channel through at least one of the lower plate or the upper plate.

* * * * *